(12) United States Patent
Nakata

(10) Patent No.: US 11,190,714 B2
(45) Date of Patent: Nov. 30, 2021

(54) ELECTRONIC DEVICE, HEAD-MOUNTED DISPLAY, GAZE POINT DETECTOR, AND PIXEL DATA READOUT METHOD

(71) Applicant: SONY INTERACTIVE ENTERTAINMENT INC., Tokyo (JP)

(72) Inventor: Masashi Nakata, Kanagawa (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/969,510

(22) PCT Filed: Mar. 8, 2018

(86) PCT No.: PCT/JP2018/008908
§ 371 (c)(1),
(2) Date: Aug. 12, 2020

(87) PCT Pub. No.: WO2019/171522
PCT Pub. Date: Sep. 12, 2019

(65) Prior Publication Data
US 2020/0412983 A1 Dec. 31, 2020

(51) Int. Cl.
*G06T 7/70* (2017.01)
*H04N 5/345* (2011.01)
*G06F 3/01* (2006.01)
*G06T 7/20* (2017.01)
*H04N 5/378* (2011.01)
*H04N 7/18* (2006.01)

(52) U.S. Cl.
CPC ........... *H04N 5/3454* (2013.01); *G06F 3/013* (2013.01); *G06T 7/20* (2013.01); *G06T 7/70* (2017.01); *H04N 5/378* (2013.01); *H04N 7/18* (2013.01); *G06T 2207/30201* (2013.01)

(58) Field of Classification Search
None
See application file for complete search history.

(56) References Cited

U.S. PATENT DOCUMENTS

2017/0010662 A1* 1/2017 Nishizawa ........... H04B 5/0031
2017/0208251 A1* 7/2017 Shamir ................ H04N 5/2328
2020/0348754 A1* 11/2020 Ehrlich .................... A61B 1/00

FOREIGN PATENT DOCUMENTS

JP 2006-060496 A 3/2006
JP 2007-281548 A 10/2007
(Continued)

OTHER PUBLICATIONS

International Preliminary Report on Patentability dated Sep. 17, 2020, from the corresponding PCT/JP2018/008908, 22 sheets.
(Continued)

*Primary Examiner* — Eileen M Adams
(74) *Attorney, Agent, or Firm* — Katten Muchin Rosenman LLP

(57) ABSTRACT

In a plane of a captured image 202, a gaze-corresponding point 204 corresponding to a user's gaze point with respect to a displayed image is identified. Then, an area of interest 206 is determined based on the identified gaze-corresponding point 204. A space imaging section determines rows or pixel blocks in an imaging plane 208 that include the area of interest 206 and reads out and outputs data in pixel columns included in the rows or pixel blocks prior to other areas.

16 Claims, 13 Drawing Sheets

(56) References Cited

FOREIGN PATENT DOCUMENTS

| | | |
|---|---|---|
| JP | 2013-046125 A | 3/2013 |
| JP | 2013-046232 A | 3/2013 |
| JP | 2013-116162 A | 6/2013 |
| JP | 2013-236298 A | 11/2013 |
| JP | 2014-023067 A | 2/2014 |
| JP | 2015-070476 A | 4/2015 |
| JP | 2015-231106 A | 12/2015 |
| JP | 2016-116162 A | 6/2016 |
| JP | 2016-184843 A | 10/2016 |
| JP | 2018-004950 A | 1/2018 |

OTHER PUBLICATIONS

International Search Report and Written Opinion dated May 22, 2018, from the corresponding PCT/JP2018/008908, 14 sheets.

* cited by examiner

FIG. 6
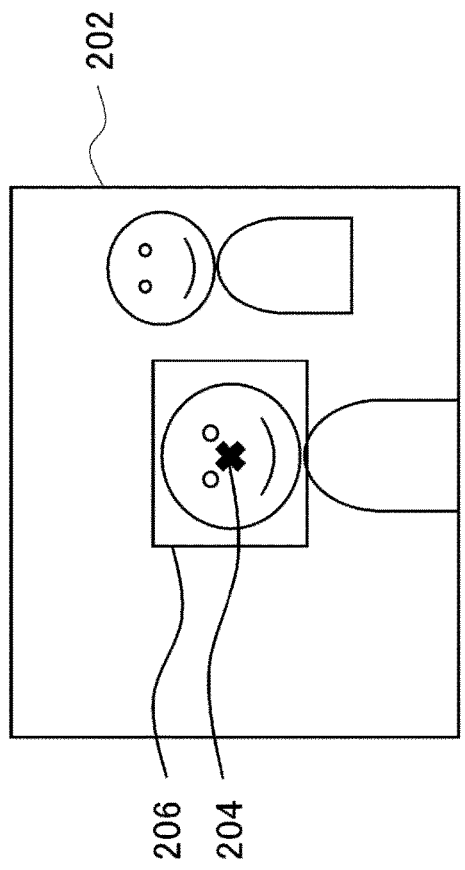
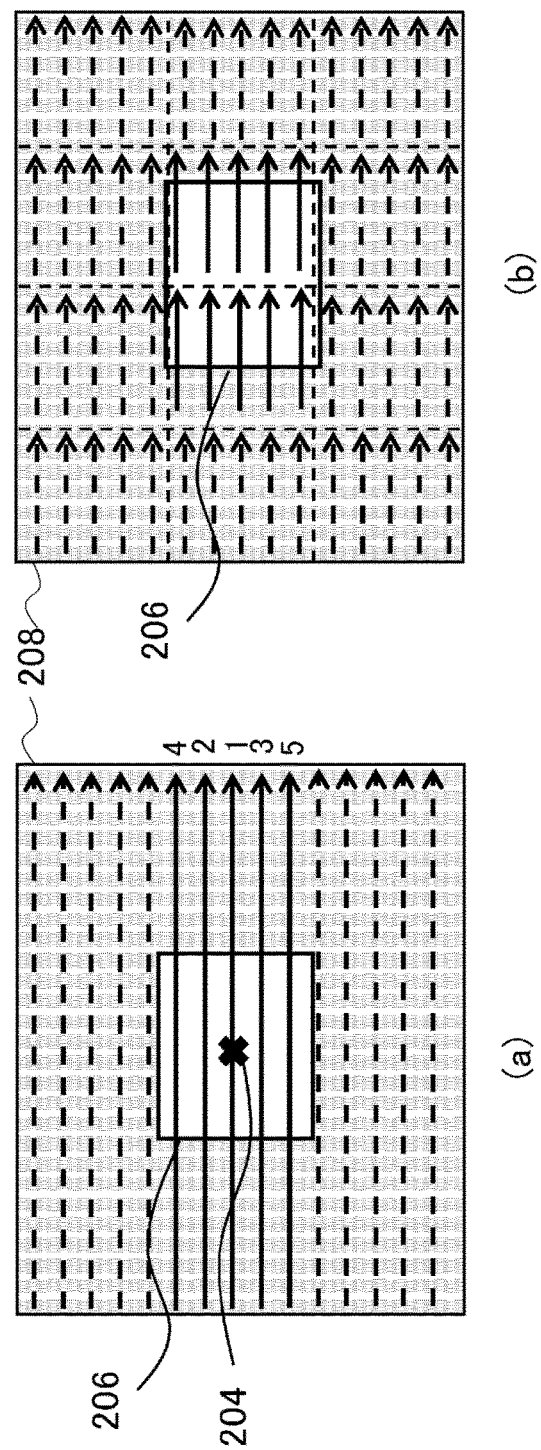

ELECTRONIC DEVICE, HEAD-MOUNTED DISPLAY, GAZE POINT DETECTOR, AND PIXEL DATA READOUT METHOD

TECHNICAL FIELD

The present invention relates to an imaging sensor for capturing an image to be used for analysis or display, a head-mounted display for displaying an image by using a captured image, a gaze point detector for detecting a user's gaze point, and a pixel data readout method.

BACKGROUND ART

Technologies for using a captured image for immediate analysis or display have been widely put to practical use. For example, there is a known technology for implementing augmented reality and virtual reality in a wearable display, such as a head-mounted display, by capturing an image of a real space in the field of view corresponding to a user's gaze, processing the captured image in a predetermined manner, and displaying the processed captured image. In an aspect where a captured image is processed and displayed immediately on the spot, real-time performance of a head-mounted display and other wearable displays is important.

SUMMARY

Technical Problems

Meanwhile, an attempt to improve the accuracy of image processing and the definition of display tends to increase the amount of data of an original captured image. Consequently, due, for instance, to the transmission bands and processing performances of imaging devices, image processing devices, and display devices, it is highly likely that a significant delay occurs between image capture and display. This results in impairing a realistic sensation and giving stress to a user.

The present invention has been made in view of the above circumstances. An object of the present invention is to provide a technology that makes it possible to analyze and display a captured image with low delay.

Solution to Problems

An aspect of the present invention relates to an electronic device. The electronic device includes a control circuit, a readout processing circuit, and an output circuit. The control circuit determines, based on predetermined criteria, an area of interest with respect to an imaging plane having pixels arranged in a matrix form, and exercises control in such a manner that pieces of data retained by the individual pixels are read out in an order dependent on a location of the area of interest. The readout processing circuit reads out pixel data in the controlled order and performs a predetermined process on the pixel data. The output circuit sequentially outputs the pixel data subjected to the predetermined process.

Here, the "electronic device" may be an imaging sensor, an imaging device, an information terminal, a mobile terminal, a gaming device, a wearable display, a personal computer, or other device as far as it has an imaging function, and is not limited to a particular type of device.

Another aspect of the present invention relates to a head-mounted display. The head-mounted display includes an imaging sensor, a display panel, and a gaze point detector. The display panel displays an image that is generated based on an image captured by the imaging sensor. The gaze point detector detects the gaze point of a user with respect to the displayed image. The imaging sensor includes a control circuit, a readout processing circuit, and an output circuit. The control circuit determines an area of interest according to a gaze-corresponding point in an imaging plane, which corresponds to the gaze point, and exercises control in such a manner that pieces of data retained by individual pixels are read out in an order dependent on a location of the area of interest. The readout processing circuit reads out the pixel data in the controlled order and performs a predetermined process on the pixel data. The output circuit sequentially outputs the pixel data subjected to the predetermined process.

Yet another aspect of the present invention relates to a gaze point detector. The gaze point detector includes an imaging sensor and an image analysis section. The imaging sensor captures an image of eyeballs of the user viewing a display screen. The image analysis section acquires position coordinates of a gaze point on the display screen according to the captured image. The imaging sensor includes a control circuit, a readout processing circuit, and an output circuit. The control circuit determines an area of interest according to an image captured at a previous time point and exercises control in such a manner that pieces of data retained by individual pixels are read out in an order dependent on a location of the area of interest. The readout processing circuit reads out the pixel data in the controlled order and performs a predetermined process on the pixel data. The output circuit sequentially outputs the pixel data subjected to the predetermined process.

Still another aspect of the present invention relates to a pixel data readout method. The pixel data readout method includes the steps of determining, based on predetermined criteria, an area of interest with respect to an imaging plane having pixels arranged in a matrix form, and exercising control in such a manner that pieces of data retained by the individual pixels are read out in an order dependent on a location of the area of interest, reading out the pixel data in the controlled order and performing a predetermined process on the pixel data, and sequentially outputting the pixel data subjected to the predetermined process.

Any combinations of the aforementioned elements and any conversions of expressions of the present invention, for example, between methods, devices, systems, computer programs, and recording media storing computer programs are also effective as embodiments of the present invention.

Advantageous Effect of Invention

The present invention provides an image analysis/image display technology that makes it possible to analyze and display a captured image with low delay.

BRIEF DESCRIPTION OF DRAWINGS

FIG. 6 depicts diagrams illustrating a process performed by a space imaging section according to the embodiment in order to preferentially read out data in an area of a captured image that corresponds to a gaze point in a display image.

DESCRIPTION OF EMBODIMENT

Figure 1:
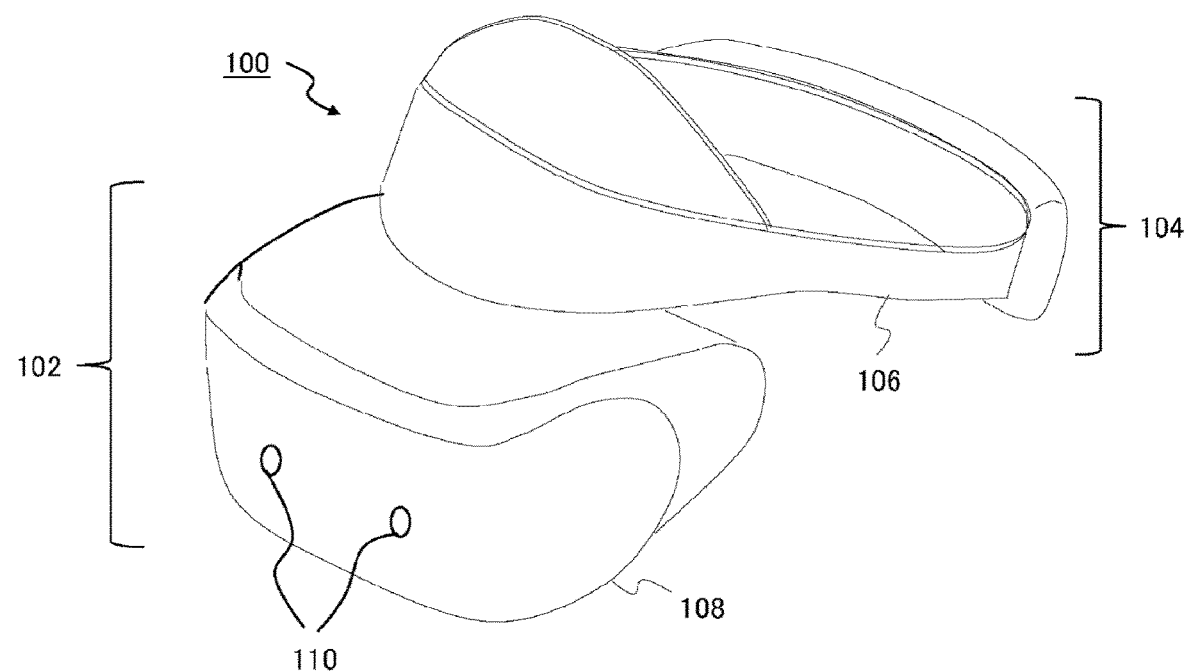
FIG. 1 is a diagram illustrating an external view example of a head-mounted display according to an embodiment of the present invention.

An embodiment described here relates to a technology for performing a predetermined process and displaying an image with low delay by using relevant image data outputted from an imaging device. In this respect, the forms of an imaging, image processing, and display devices are not particularly limited. However, the subsequent description deals, for example, with a system including an image processing device and a head-mounted display having an imaging device and a display device. FIG. 1 illustrates an external view example of a head-mounted display according to the present embodiment. In the present example, a head-mounted display 100 includes an output mechanism section 102 and a mounting mechanism section 104. The mounting mechanism section 104 includes a mounting band 106 that fastens the head-mounted display 100 to the whole circumference of the head of a user when the user wears the head-mounted display 100.

The output mechanism section 102 includes a housing 108. The housing 108 is shaped so as to cover the left and right eyes of the user when the user wears the head-mounted display 100. A display panel is disposed inside the housing 108 and adapted to face the eyes of the user when the user wears the head-mounted display 100. The housing 108 may additionally include a lens that is positioned between the display panel and the user's eyes when the user wears the head-mounted display 100 and adapted to enlarge an angle of view of the user. A stereoscopic vision may be provided by displaying stereo images corresponding to a parallax of the left and right eyes in areas obtained by dividing the display panel into left and right portions.

The head-mounted display 100 may further include speakers or earphones that are positioned to match the ears of the user when the user wears the head-mounted display 100. In the present example, the head-mounted display 100 includes a space imaging section 110 that is disposed on a front surface of the housing 108. The space imaging section 110 captures a video of a surrounding real space in a field of view that corresponds to a user's gaze. In the illustrated example, the space imaging section 110 includes a stereo camera for capturing an image of a forward space from left and right points of view that correspond to the left and right eyes of the user. However, the space imaging section 110 is not limited to such a stereo camera and may include a monocular camera or a multi-lens camera having three or more lenses.

The head-mounted display 100 additionally includes a gaze point detector. The gaze point detector is disposed inside the housing 108 and adapted to detect a point on the screen of the display panel that is gazed at by the user. The head-mounted display 100 may further include at least one of an acceleration sensor, a gyro sensor, a geomagnetic sensor, and various other sensors for detecting a motion, a posture, and a location of the head-mounted display 100.

Figure 2:
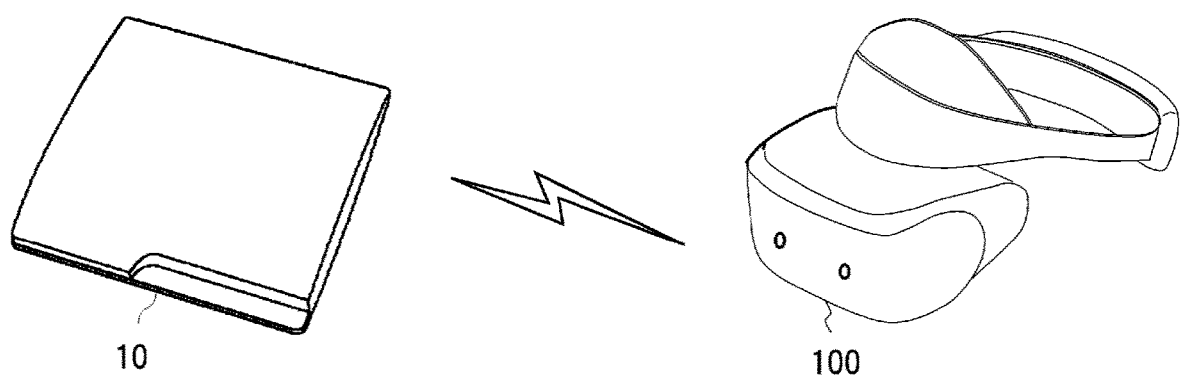
FIG. 2 is a diagram illustrating a configuration example of an image display system according to the embodiment.

FIG. 2 illustrates a configuration example of an image display system according to the present embodiment. The head-mounted display 100 is wirelessly connected to an image processing device 10. Alternatively, however, the head-mounted display 100 may be wiredly connected to the image processing device 10, for example, through a USB (Universal Serial Bus). The image processing device 10 may be further connected to a server through a network. In such a case, the server may supply, to the image processing device 10, an online application such as a game in which a plurality of users can participate through a network.

The image processing device 10 continuously acquires data of images captured by the space imaging section 110 of the head-mounted display 100, generates a display image in a field of view corresponding to the acquired data, and outputs the generated display image to the head-mounted display 100. Here, the contents of the display image are not particularly limited and may vary, for example, with a user-demanded system function or the contents of a launched application.

For example, the image processing device 10 may subject an image captured by the space imaging section 110 to certain processing, or draw, in a superimposed manner, a virtual object interacting with an image of a real object. Alternatively, based, for example, on a captured image or a value measured by a motion sensor of the head-mounted display 100, the image processing device 10 may draw a virtual world in a field of view corresponding to a user's field of view. These aspects are typically implemented, for example, by VR (Virtual Reality) and AR (Augmented Reality). An alternative is to directly use a captured image as a display image and implement a see-through function so that a real world is visible through the screen of the head-mounted display 100.

In a case where a series of processes is repeatedly performed at a predetermined frame rate as described above, in order to transmit a captured image from the head-mounted display 100 to the image processing device 10 and let the image processing device 10 generate a display image and transmit the display image to the head-mounted display 100, the speed of processing and data transmission performed by each device is important. That is, if any one of the processes is delayed, a time lag arises between the motion of a user's head and the display image so that the user may feel uncomfortable or experience visually-induced motion sickness.

In view of the above circumstances, countermeasures have conventionally been taken in order to extend a transmission band or use a high compression ratio to reduce the amount of data. However, improving the quality of a display image and the accuracy of information processing results in an increase in the amount of data to be handled. Therefore, the above-mentioned countermeasures are inadequate in some cases. In the present embodiment, processing to be performed at a stage of captured image data readout is improved in such a manner as to give time priority to an area in an image plane. More specifically, the space imaging section 110 identifies a spot gazed at by the user, locates an area of a captured image that corresponds to the identified spot, and preferentially reads out and outputs data in the located area prior to the other areas.

The above-mentioned "preferential readout" process may be performed at a stage where an electric charge obtained by converting light detected by an imaging element is read out or at a stage where an analog signal representing an electric charge is converted to a digital signal, recorded in a memory, and read out. In any case, as far as the space imaging section 110 performs subsequent processing in the order of readout or in an order similar to the order of readout, data in high-priority pixels is preferentially transmitted to the image processing device 10. As regards image analysis, display image generation, and display image transmission to and display on the head-mounted display 100, the image processing device 10 may perform all or some of such processes in an order based on the above-mentioned priority.

Consequently, the certainty of image analysis and the immediacy of display can be assured for an area gazed at by the user. Further, as regards the other areas, it is possible to minimize the influence on appearance and further increase the speed of processing by omitting some of the processes and reducing the resolution and the level of detail. The present embodiment is similarly effective in an aspect other than the aspect where the head-mounted display 100 includes the space imaging section 110 as described above.

For example, the space imaging section may be disposed toward the image processing device 10 or a separate imaging device connected to the image processing device 10 through a network. Another alternative is to implement the space imaging section as robot's eyes and display an image in a field of view corresponding to that of the robot's eyes. The display device is not limited to the head-mounted display 100. The display device may be, for example, a flat-panel display capable of obtaining a user's gaze point. The image processing device 10 and the display device may be substituted, for example, by a mobile terminal in which they are integrated. Such a mobile terminal may further include an imaging device.

Figure 3:
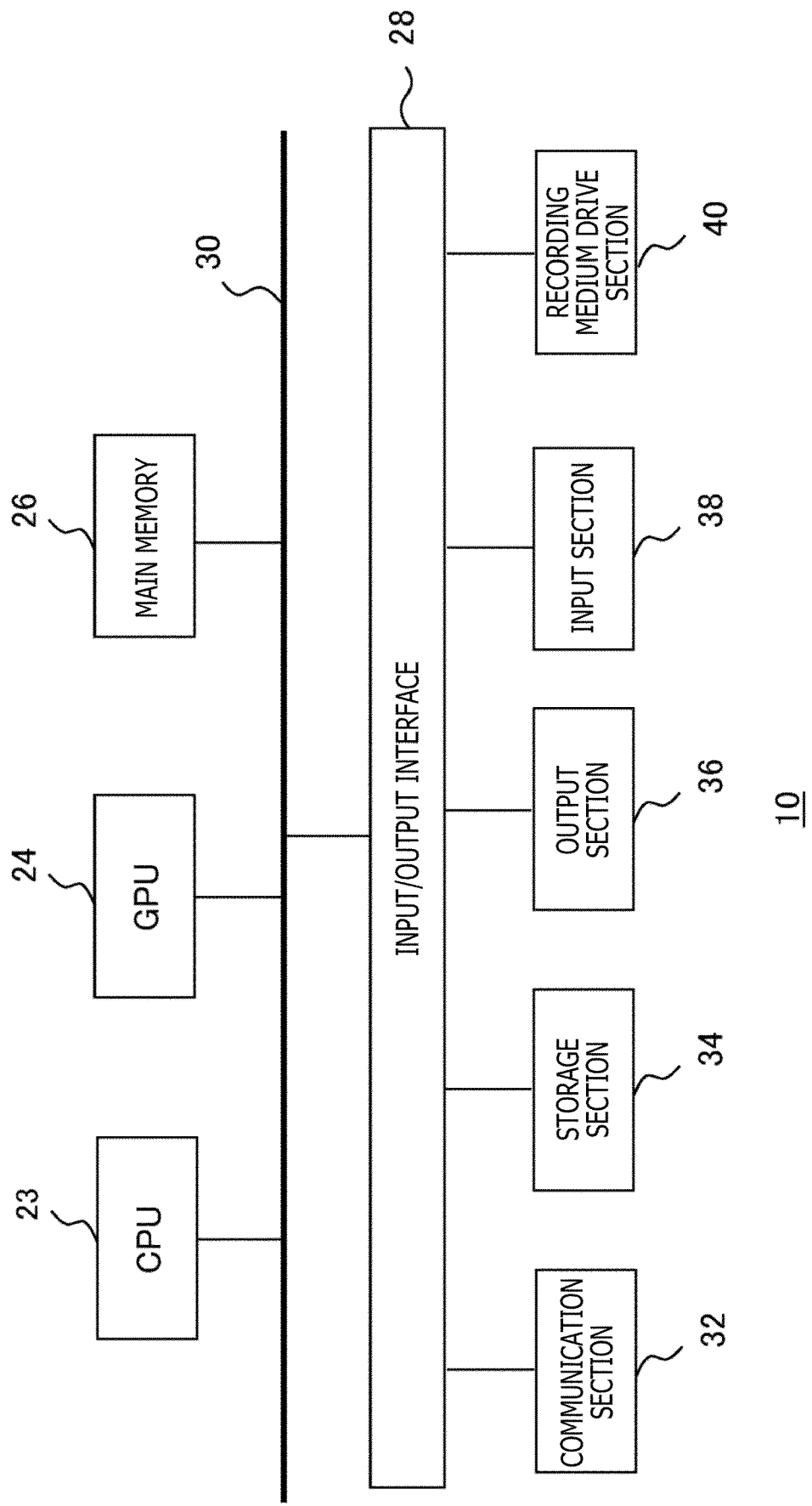
FIG. 3 is a diagram illustrating an internal circuit configuration of an image processing device according to the embodiment.

FIG. 3 illustrates an internal circuit configuration of the image processing device 10. The image processing device 10 includes a CPU (Central Processing Unit) 23, a GPU (Graphics Processing Unit) 24, and a main memory 26. These sections are interconnected through a bus 30. The bus 30 is further connected to an input/output interface 28. The input/output interface 28 is connected to a USB, IEEE (Institute of Electrical and Electronics Engineers) 1394, or other peripheral device interface, a communication section 32 including a wired or wireless LAN (Local Area Network) network interface for establishing communication with the head-mounted display 100, a storage section 34 such as a hard disk drive or a nonvolatile memory, an output section 36 for outputting data to the head-mounted display 100, an input section 38 for inputting data from the head-mounted display 100 and an undepicted input device, and a recording medium drive section 40 for driving a removable recording medium such as a magnetic disk, an optical disk, or a semiconductor memory.

The CPU 23 provides overall control of the image processing device 10 by executing an operating system stored in the storage section 34. The CPU 23 also executes various programs that are read out from a removable recording medium and loaded into the main memory 26 or downloaded through the communication section 32. The GPU 24 functions as a geometry engine and, as a rendering processor, performs a drawing process in accordance with a drawing command from the CPU 23 to output the result of the drawing process to the output section 36. The main memory 26 includes a RAM (Random Access Memory) and stores programs and data necessary for processing.

Figure 4:
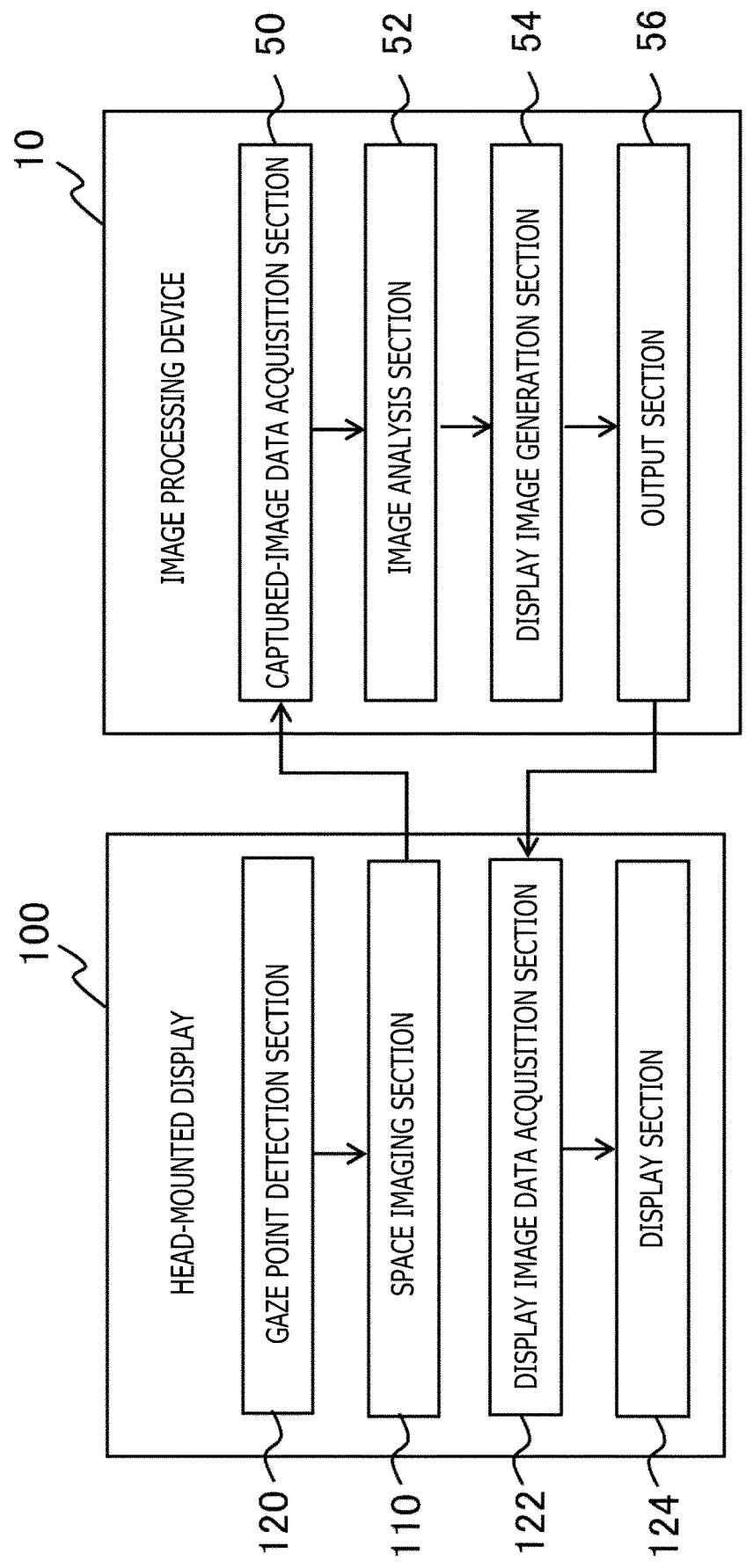
FIG. 4 is a diagram illustrating functional block configurations of the image processing device and the head-mounted display according to the embodiment.

FIG. 4 illustrates functional block configurations of the image processing device 10 and head-mounted display 100. The functional blocks depicted in FIG. 4 can be implemented by hardware such as various circuits depicted in FIG. 3, a gaze point detection device, an imaging element, a control circuit, a signal processing circuit, a display panel, a microprocessor, or a memory, and be implemented by software, that is, programs loaded into a memory from a recording medium in order to perform various functions such as image analysis, information processing, image drawing, data input/output, and communication functions. Therefore, it will be understood by those skilled in the art that the functional blocks may be variously implemented by hardware only, by software only, or by a combination of hardware and software. The method of implementing the functional blocks is not particularly limited.

The head-mounted display 100 includes a gaze point detection section 120, the space imaging section 110, a display image data acquisition section 122, and a display section 124. The gaze point detection section 120 detects a user's gaze point with respect to a display screen. The space imaging section 110 captures an image of a space and outputs data in the order based on information regarding a gaze point. The display image data acquisition section 122 acquires data of a display image from the image processing device 10. The display section 124 displays the display image. The gaze point detection section 120 acquires position coordinates of the user's gaze point with respect to the display screen of the head-mounted display 100. As mentioned later, various gaze point detection technologies are put to practical use. The present embodiment may use any one of them.

The space imaging section 110 captures a video for use as a display image as mentioned earlier and preferentially outputs data in pixels in an area of each frame that corresponds to a gaze point. Basically, the space imaging section 110 also outputs data in pixels in the other areas. However, a resolution and an output rate may vary depending on the case. As depicted in FIG. 1, a stereo camera may be used as the space imaging section 110. The display image data acquisition section 122 continuously acquires data of the display image from the image processing device 10. In this instance, too, the data may preferentially be acquired from an area corresponding to the gaze point.

The display section 124 displays a display image at a predetermined rate. The display section 124 may be a liquid-crystal display, an organic EL (Electroluminescence)

display, or other common display having a display panel and a control mechanism. However, the order of driving display elements may be properly controlled in such a manner as to output the display image in an order corresponding to the output order used by the space imaging section 110. In such a case, an update is preferably performed on an area of the display image that is gazed at by the user.

The image processing device 10 includes a captured-image data acquisition section 50, an image analysis section 52, a display image generation section 54, and an output section 56. The captured-image data acquisition section 50 acquires data of a captured image from the head-mounted display 100. The image analysis section 52 performs a predetermined analysis process on a captured image. The display image generation section 54 generates a display image by using, for example, the result of analysis. The output section 56 supplies data of a display image to the head-mounted display 100. The captured-image data acquisition section 50 acquires data of a captured image that is outputted from the space imaging section 110 of the head-mounted display 100.

As mentioned earlier, the space imaging section 110 gives time priority to data in pixels in an area of a captured image that corresponds to the user's gaze point, and preferentially outputs such priority data. Therefore, the captured-image data acquisition section 50 also acquires data in such a priority area prior to the other areas. The image analysis section 52 analyzes a captured image in a predetermined manner. For example, the image analysis section 52 may perform face detection, face recognition, gesture recognition, visual tracking, or location detection. Alternatively, the image analysis section 52 may perform Visual SLAM (Simultaneous Localization and Mapping) to acquire the posture of the head-mounted display 100.

In the above instance, the image analysis section 52 may preferentially analyze an area that is transmitted from the head-mounted display 100 prior to the other areas. As regards areas not corresponding to the user's gaze point, the image analysis section 52 may omit the analysis process or reduce the level of detail. This at least ensures that the result of analysis of an area gazed at by the user is certainly obtained. The display image generation section 54 generates data of a display image by using, for example, the result of analysis. In this case, too, the display image generation section 54 may preferentially generate an area corresponding to an area in a captured image that is transmitted from the head-mounted display 100 prior to the other areas.

Processing performed by the display image generation section 54 may vary depending on the purpose of image display. The display image generation section 54 may draw an image upon a part of a captured image as mentioned earlier or draw a whole display image according to a field of view that is acquired from a captured image, for example, by SLAM. Information regarding the location and posture of the user's head may be acquired based on a value measured by an undepicted motion sensor included in the head-mounted display 100. Further, a captured image may be directly outputted as a display image. In such a case, the image analysis section 52 may omit the process.

In any case, the display image generation section 54 supplies the data of a display image to the output section 56 in the order of pixel generation. For example, in a case where image analysis and display image generation are to be performed in the order of pixel acquisition by the captured-image data acquisition section 50, the data in the pixels in the display image are eventually supplied to the output section 56 in an order based on the order of output from the space imaging section 110. The output section 56 sequentially transmits the supplied data of the display image to the head-mounted display 100.

Figure 5:
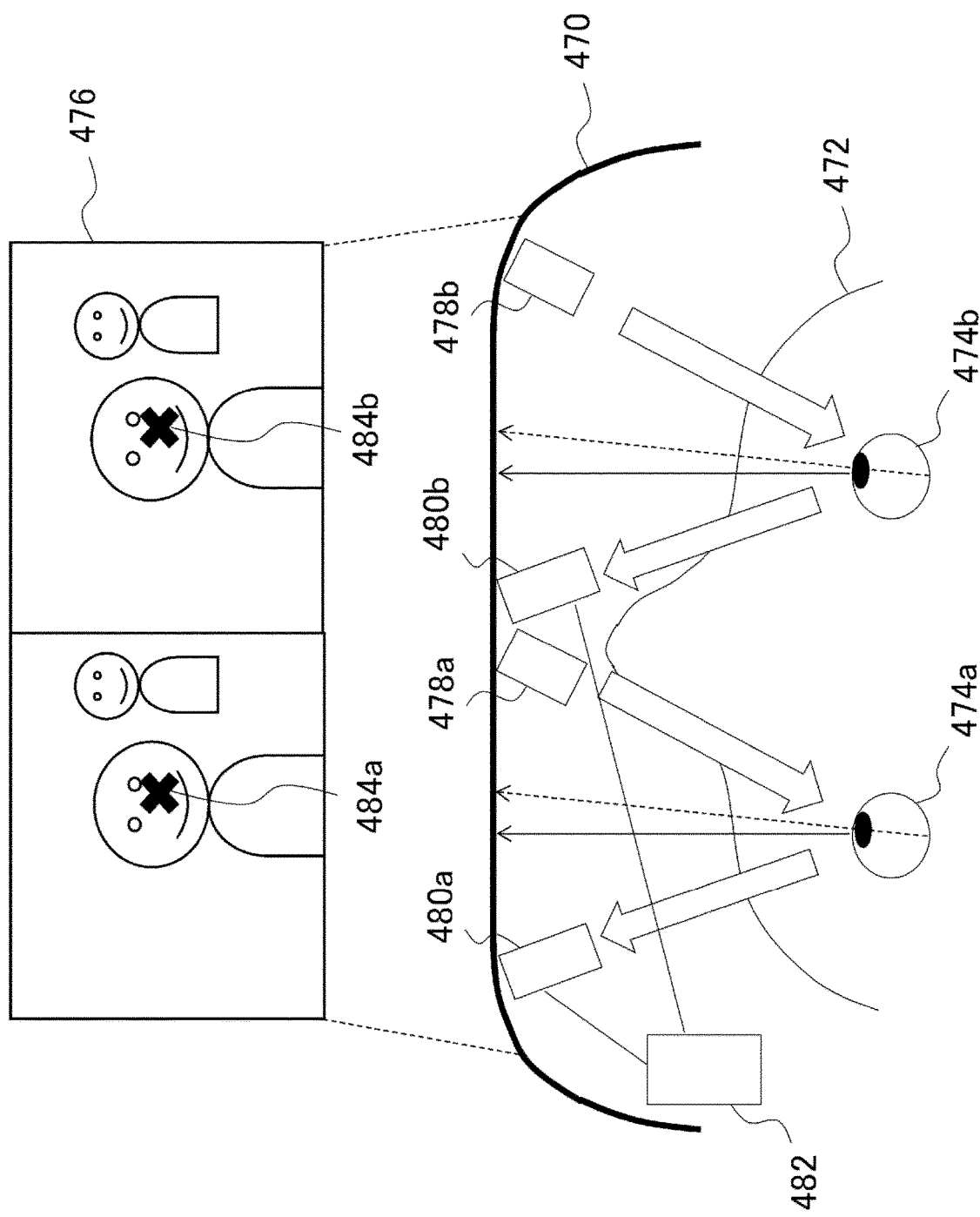
FIG. 5 is a diagram illustrating a configuration example of a gaze point detection section of the head-mounted display according to the embodiment.

FIG. 5 illustrates a configuration example of the gaze point detection section 120 of the head-mounted display 100. The lower portion of FIG. 5 schematically depicts a top view of the head-mounted display 100 and a head 472 of the user wearing the head-mounted display 100. A display image 476 depicted, for example, in the upper portion of FIG. 5 is displayed on the head-mounted display 100 and viewed by left and right eyes 474*a* and 474*b* of the user. In the present example, the gaze point detection section 120 includes infrared LEDs (Light Emitting Diodes) 478*a* and 478*b*, infrared cameras or PSD (Position Sensing Device) sensors 480*a* and 480*b*, and an image analysis device 482.

The infrared LEDs 478*a* and 478*b* respectively apply infrared rays to the user's left and right eyes 474*a* and 474*b*. The infrared cameras or PSD sensors 480*a* and 480*b* respectively capture images of the user's left and right eyes 474*a* and 474*b* and supplies data of the captured images to the image analysis device 482. The image analysis device 482 identifies infrared ray reflection positions on corneas and locations of pupils from the captured images of the left and right eyes, and then identifies the user's gaze from the positional relation between the infrared ray reflection positions and locations of pupils. This method is known as the corneal reflex method and put to practical use in the field of gaze detection technology.

The method of gaze detection is not limited to the above one. An alternative, for example, is to use a common method such as a method of capturing images of the left and right eyes with a visible light camera and identifying the gaze from the positional relation between eyes' inner corners and irises. The image analysis device 482 regards points of intersection 484*a* and 484*b* between the identified gaze and the display panel displaying the display image 476 as the user's gaze point, and detects the position coordinates of the user's gaze point. Information regarding the position coordinates of the gaze point is supplied to the space imaging section 110, for example, at a predetermined rate.

FIG. 6 is a diagram illustrating a process performed by the space imaging section 110 in order to preferentially read out data in an area of a captured image that corresponds to a gaze point in a display image. A captured image 202 in the upper portion of FIG. 6 represents an image captured by the space imaging section 110. In a case where the space imaging section 110 includes a stereo camera, similar images are captured from left and right points of view. The captured image 202 is used as a source image for the display image 476 depicted in FIG. 5.

FIG. 6 assumes that the display image 476 and the captured image 202 are the same. However, they need not always be the same. More specifically, the display image 476 may be obtained by superimposing a virtual object on the captured image 202 or be entirely drawn by computer graphics. In any case, planar position coordinates of the captured image 202 correspond to planar position coordinates of the display image 476.

In the captured image 202, a position corresponding to a user's gaze point is assumed to be a gaze-corresponding point 204. From the position coordinates of a gaze point acquired from the gaze point detection section 120, the space imaging section 110 identifies position coordinates of the gaze-corresponding point 204 in an imaging field of view. The space imaging section 110 then preferentially reads out pixel values (analog signals or digital signals) from an area within a predetermined range including the gaze-corresponding point 204 (this area is referred to as an area of interest 206). The area of interest 206 may be on an image plane, centered on the gaze-corresponding point 204, and of a predetermined size. The size of the area of interest 206 may be adjusted according to the size of an object image such as a human image formed at the gaze-corresponding point 204. Further, the shape of the area of interest 206 is not limited to rectangular and may be circular or oval or dependent on the shape of the object image.

Lower portions (a) and (b) of FIG. 6 illustrate the order in which the pixel values are read out. In a common imaging device, in an imaging plane formed by a matrix of pixels, the pixel values are sequentially read out in a raster order, rightward from the leftmost pixels and downward from the uppermost pixels. Solid line arrows and broken line arrows in (a) of FIG. 6 schematically indicate the rows of such pixels. It should be noted, however, that the present embodiment preferentially reads out the columns of pixels indicated by the solid line arrows.

More specifically, within an imaging plane 208 in (a) of FIG. 6, the rows including the area of interest 206 are first read out from the leftmost pixel to the rightmost pixel. In this instance, the relevant rows may be read out in the order from the uppermost row to the lowermost row, or the relevant rows closer to the gaze-corresponding point 204 may preferentially be read out. That is, as indicated by the numbers 1 to 5 on the right side of an image, the row (1) closest to the gaze-corresponding point 204 may be first read out, then the upper and lower rows (2 and 3) may be read out, and finally the further upper and lower rows (4 and 5) may be read out. In short, the upper and lower rows may alternately be read out in the order of closeness to the gaze-corresponding point 204.

In a case depicted in (b) of FIG. 6, the imaging plane is divided into a plurality of blocks, and the blocks including the area of interest 206 are preferentially read out. As described later, this aspect assumes that each block includes a processing circuit for reading out the pixel values. Pixel columns including the area of interest 206, which are preferentially read out, may hereinafter be referred to as the "priority pixel columns." In both of the cases depicted in (a) and (b) of FIG. 6, after the data in the priority pixel columns are read out, the data in the other areas are read out as indicated by the broken line arrows. As regards the above-mentioned areas, too, the data in the rows and blocks closer to the gaze-corresponding point 204 may preferentially be read out, or the data may sequentially be read out in the order from the upper left corner of the imaging plane.

Further, the frequency of data readout from the above-mentioned areas may be set to be lower than the frequency of priority pixel column readout. The earlier-described conventional technology is such that a time point at which the data in the area of interest 206 begins to be read out is dependent on the location of the gaze point because the order of readout is fixed without regard to the gaze point. Meanwhile, when the data in the area of interest 206 are preferentially read out and outputted as depicted in (a) and (b) of FIG. 6, the time point at which the data is to be read out can be estimated independently of the location of the gaze point. Moreover, when the frequency of readout of areas other than those of priority pixel columns is set to be lower than that of the priority pixel columns, it is possible to immediately perform image analysis of an area gazed at by the user and display the corresponding area.

Figure 7:
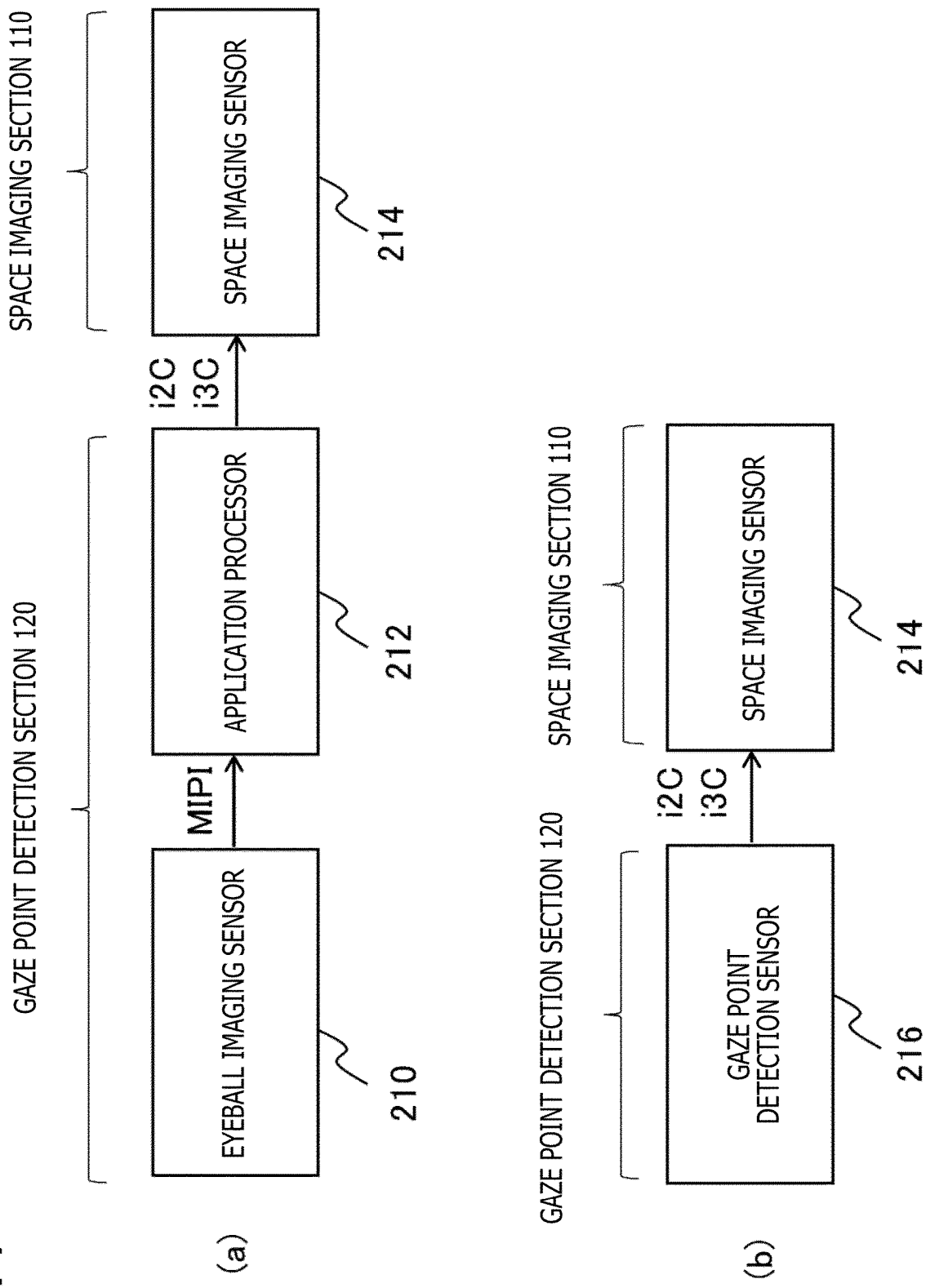
FIG. 7 depicts diagrams illustrating hardware configuration examples of the gaze point detection section and the space imaging section according to the embodiment.

FIG. 7 illustrates hardware configuration examples of the gaze point detection section 120 and the space imaging section 110. In example (a) of FIG. 7, an eyeball imaging sensor 210 and an application processor 212 are included as the gaze point detection section 120, and a space imaging sensor 214 is included as the space imaging section 110. The eyeball imaging sensor 210 captures an image of eyeballs. The application processor 212 acquires a gaze point from the captured image of the eyeballs. The space imaging sensor 214 captures an image of a space and outputs pixel values in an order based on a gaze point. This configuration is similar to the configuration depicted in FIG. 5. The eyeball imaging sensor 210 corresponds to the infrared cameras or PSD sensors 480a and 480b, and the application processor 212 corresponds to the image analysis device 482.

In this configuration, the MIPI (Mobile Industry Processor Interface) architecture can be used for captured-image data transmission from the eyeball imaging sensor 210 to the application processor 212. Further, the i2C (Inter-Integrated Circuit) or i3C (Improved Inter-Integrated Circuit) architecture can be used for gaze point information transmission from the application processor 212 to the space imaging sensor 214. Meanwhile, in the configuration depicted in example (b) of FIG. 7, a gaze point detection sensor 216 is included as the gaze point detection section 120, and the space imaging sensor 214 is included as the space imaging section 110.

Here, the gaze point detection sensor 216 is a sensor obtained by laminating the eyeball imaging sensor 210 in example (a) on a logic circuit for acquiring a gaze point based on an eyeball image captured by the eyeball imaging sensor 210, that is, a logic circuit having the functionality of the application processor 212 in example (a). The space imaging sensor 214 is similar to the one in example (a). In this case, for example, the i2C or i3C architecture is used to directly transmit information regarding the gaze point from the gaze point detection sensor 216 to the space imaging sensor 214.

Figure 8:
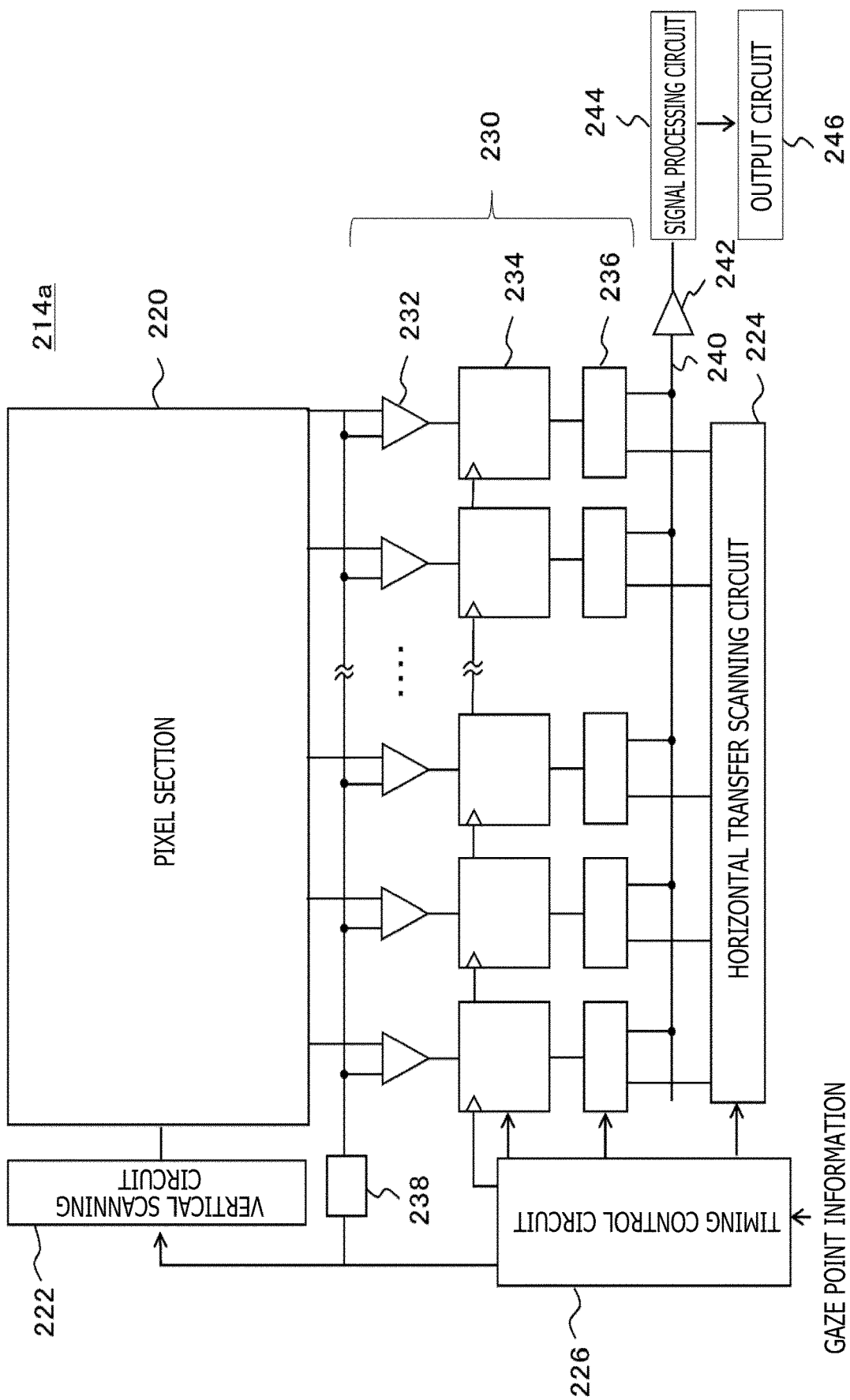
FIG. 8 is a diagram illustrating a configuration example of a space imaging sensor that implements an aspect depicted in (a) of FIG. 6.

FIG. 8 illustrates a configuration example of a space imaging sensor that implements the aspect depicted in (a) of FIG. 6. The space imaging sensor 214a includes a pixel section 220, a vertical scanning circuit 222, a horizontal transfer scanning circuit 224, a timing control circuit 226, analog-to-digital converters (ADCs (Analog-Digital Converters)) 230, a digital-to-analog converter (DAC (Digital-Analog Converter)) 238, a horizontal transfer line 240, an amplifier circuit 242, a signal processing circuit 244, and an output circuit 246.

The pixel section 220 is configured such that pixels including photodiodes are arranged in a matrix form. The photodiodes perform photoelectric conversion. Each pixel retains a signal electric charge based on incident light intensity. The vertical scanning circuit 222 drives the pixels on the basis of individual rows by supplying a drive pulse to each pixel through an undepicted pixel drive wiring. Consequently, the analog signals of pixels in a row are supplied to the ADCs 230 through a vertical signal line disposed for each column.

The ADCs 230 are configured as an analog-to-digital converter circuit so that an ADC including a comparator 232, a counter 234, and a latch 236 is disposed in each pixel column. The comparator 232 compares a reference voltage generated by the DAC 238 with an analog signal that is acquired from pixels through the vertical signal line on the basis of individual row lines. The counter 234 counts a comparison time. The latch 236 retains a count result. The analog signal read out through the vertical signal line is compared with the reference voltage having a slope waveform by the comparator 232. The count reached when the analog signal matches the reference voltage is then acquired to convert the analog signal to a digital signal. The output of each latch 236 is connected to the horizontal transfer line 240.

The horizontal transfer scanning circuit 224 includes, for example, a shift register, and sequentially outputs a horizontal scanning pulse in order to input one row of digital signals stored in the latch 236 to the amplifier circuit 242 and the signal processing circuit 244 through the horizontal transfer line 240. The timing control circuit 226 generates and outputs a clock signal and a control signal according to a vertical synchronization signal, a horizontal synchronization signal, and a master clock. The outputted clock signal and control signal are used as the operation reference for the horizontal transfer scanning circuit 224.

The signal processing circuit 244 is configured as a readout processing circuit that generates data of a captured image by performing predetermined processes, such as defect correction, demosaicing, and gamma correction processes, on the inputted digital signal for each pixel. The output circuit 246 buffers, as needed, the data of a captured image, which is generated by the signal processing circuit 244, and outputs the buffered data on the basis of individual rows. The above-described basic configuration may be similar to the configuration of an ordinary imaging sensor. Meanwhile, in the present embodiment, the data in the priority pixel columns are preferentially outputted as described earlier by varying the order in which pixel rows are driven by the vertical scanning circuit 222.

Accordingly, the timing control circuit 226 acquires information regarding a gaze point from the gaze point detection section 120 and obtains, as a gaze-corresponding point, a pixel location in the pixel section 220 that corresponds to the gaze point. The timing control circuit 226 then determines the area of interest and thus priority pixel columns, and controls the vertical scanning circuit 222 in such a manner that the priority pixel columns are preferentially driven. Stated differently, the timing control circuit 226 determines the area of interest based on the gaze-corresponding point in the imaging plane that corresponds to the position coordinates of the user's gaze point with respect to an image displayed on the head-mounted display 100 through the use of pixel data outputted from an imaging sensor.

Subsequently, the timing control circuit 226 exercises control in such a manner that the data retained by the pixels are read out in an order dependent on the location of the area of interest. Therefore, the pixel values in the priority pixel columns are preferentially subjected to analog-to-digital conversion and transferred to the signal processing circuit 244 through the horizontal transfer line 240. As the signal processing circuit 244 and the output circuit 246 process and output the data, as needed, in the order of data input, the data of a captured image are sequentially outputted to the image processing device 10 beginning with the priority pixel columns. In this case, based on the location of the area of interest, the timing control circuit 226 may determine the area to be excluded from a data readout target.

In a case where a global shutter method is adopted instead of a rolling shutter method, an undepicted memory storing the digital values of all pixels is targeted for preferential readout of the priority pixel columns. The global shutter method reads out all pixel electric charges at once and converts them to digital equivalents. The rolling shutter method scans the pixel section 220 in a raster order as depicted in a drawing. At a stage where the pixel electric charges are read out, the use of a global shutter does not cause a time lag dependent on the location on an image plane. Therefore, images stored in the memory are characterized so as to avoid a focal plane phenomenon in which image deformation occurs due to rapid movement of an object. However, as an output is generated from the memory on the basis of individual pixel columns, a similar effect is produced by preferentially outputting the priority pixel columns.

Figure 9:
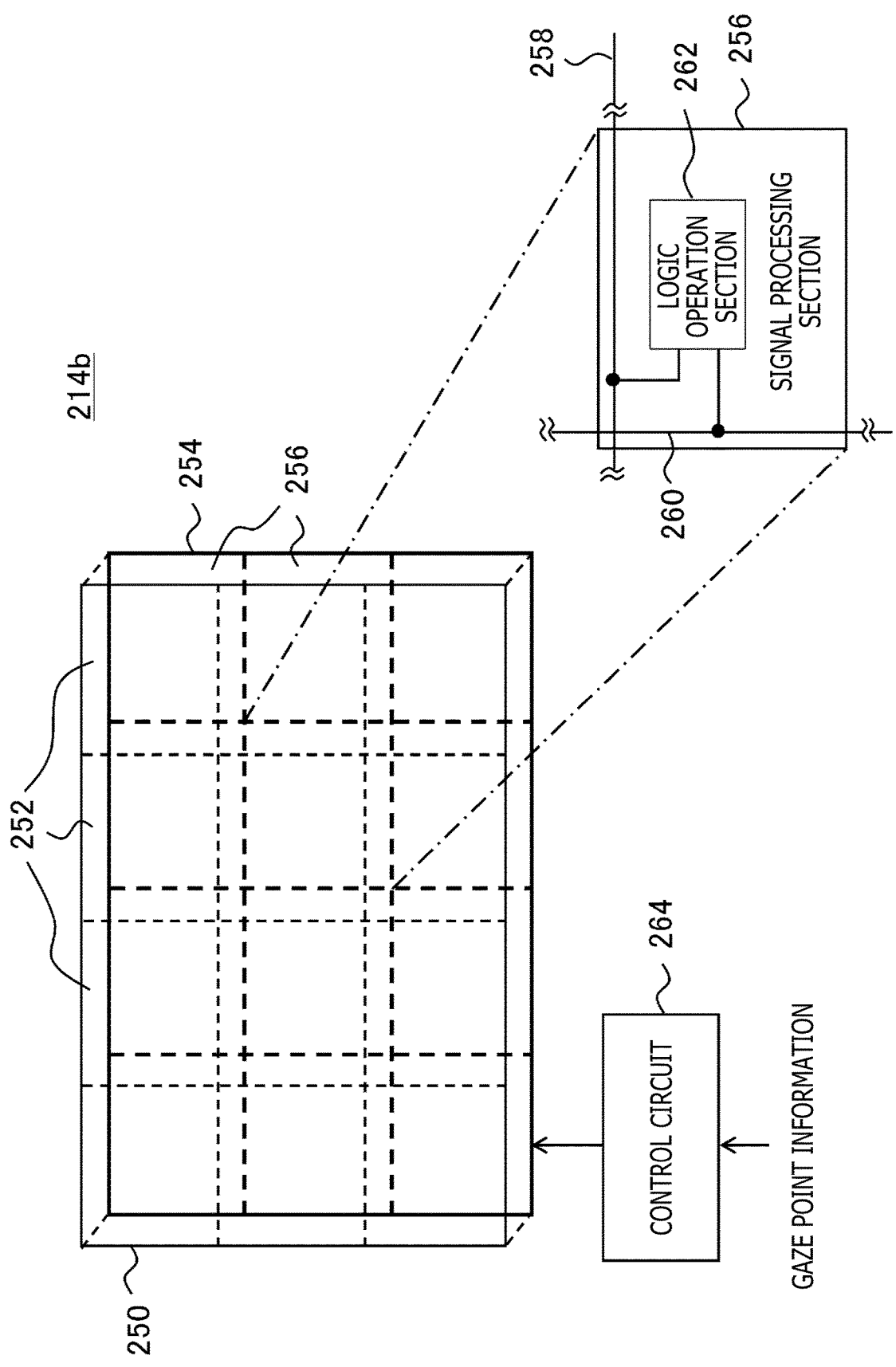
FIG. 9 is a diagram illustrating a configuration example of the space imaging sensor that implements an aspect depicted in (b) of FIG. 6.

FIG. 9 illustrates a configuration example of a space imaging sensor that implements the aspect depicted in (b) of FIG. 6. The configuration of this sensor is outlined below because it is based on an existing technology disclosed, for example, in Japanese Patent Laid-Open No. 2016-184843. A space imaging sensor 214b is structured by laminating a pixel section 250 on a readout control circuit 254. The pixel section 250 is configured such that pixels including photodiodes for performing photoelectric conversion are arranged in a matrix form. Analog signals representative of pixel values, which are derived from photoelectric conversion, are outputted to the readout control circuit 254.

Here, the plane of the pixel section 250 is divided into M×N pixel blocks 252, which each include one or more pixels. The readout control circuit 254 is configured as a readout processing circuit that includes M×N signal processing sections 256, which are respectively disposed for the pixel blocks 252. The signal processing sections 256 each perform analog-to-digital conversion and subsequent signal processing independently on the pixels in the corresponding pixel blocks 252 in a manner similar to the one described with reference to FIG. 8. Stated differently, the signal processing sections 256 exercises control so as to determine whether or not each of the pixel blocks 252 which is obtained by dividing the imaging plane 208 in both horizontal and vertical directions is targeted for data readout.

As depicted enlarged in the lower right of FIG. 9, the signal processing sections 256 of the readout control circuit 254 each include a logic operation section 262. The logic operation section 262 acquires control signals from a horizontal control line 258 and a vertical control line 260, respectively, and performs a logic operation on the acquired control signals. The horizontal control line 258 is common to one row of signal processing sections 256. The vertical control line 260 is common to one column of signal processing sections 256. The control signals for the horizontal control line 258 and the vertical control line 260 are given by a control circuit 264. The result of an operation performed by the logic operation section 262 is used to determine whether or not to operate the corresponding signal processing sections 256.

For example, let us assume that an adopted circuit configuration is formed so as to operate the signal processing sections 256 when an L level is indicated by the result of logic operation and to place the signal processing sections 256 in a standby state when an H level is indicated by the result of logic operation. If, in this instance, the logic operation section 262 is configured as an OR gate, the result of operation indicates the L level when the horizontal control signal and the vertical control signal are both at the L level. This causes the signal processing sections 256 to operate. Therefore, the control circuit 264 gives an L-level control signal to the horizontal control line 258 and the vertical control line 260 that include the signal processing sections 256 to be allowed to perform a scan, and gives an H-level control signal to the other control lines.

Consequently, the control circuit 264 acquires information regarding a gaze point from the gaze point detection section 120 and obtains a pixel location in the pixel section 250 that corresponds to the gaze point. The control circuit 264 then determines the area of interest and thus priority pixel columns (pixel blocks) and determines the level of a signal to be given to each control line in such a manner that the priority pixel columns are preferentially driven. The sensor configuration depicted in FIG. 9 requires extra control lines and arithmetic circuits but is able to narrow the range of priority pixel columns until it approaches the actual area of interest. This makes it easier to achieve an effect. In consideration of such an effect, a proper sensor configuration is selected from multiple points of view such as accuracy and responsiveness required for processing and display and the cost of manufacture.

Figure 10:
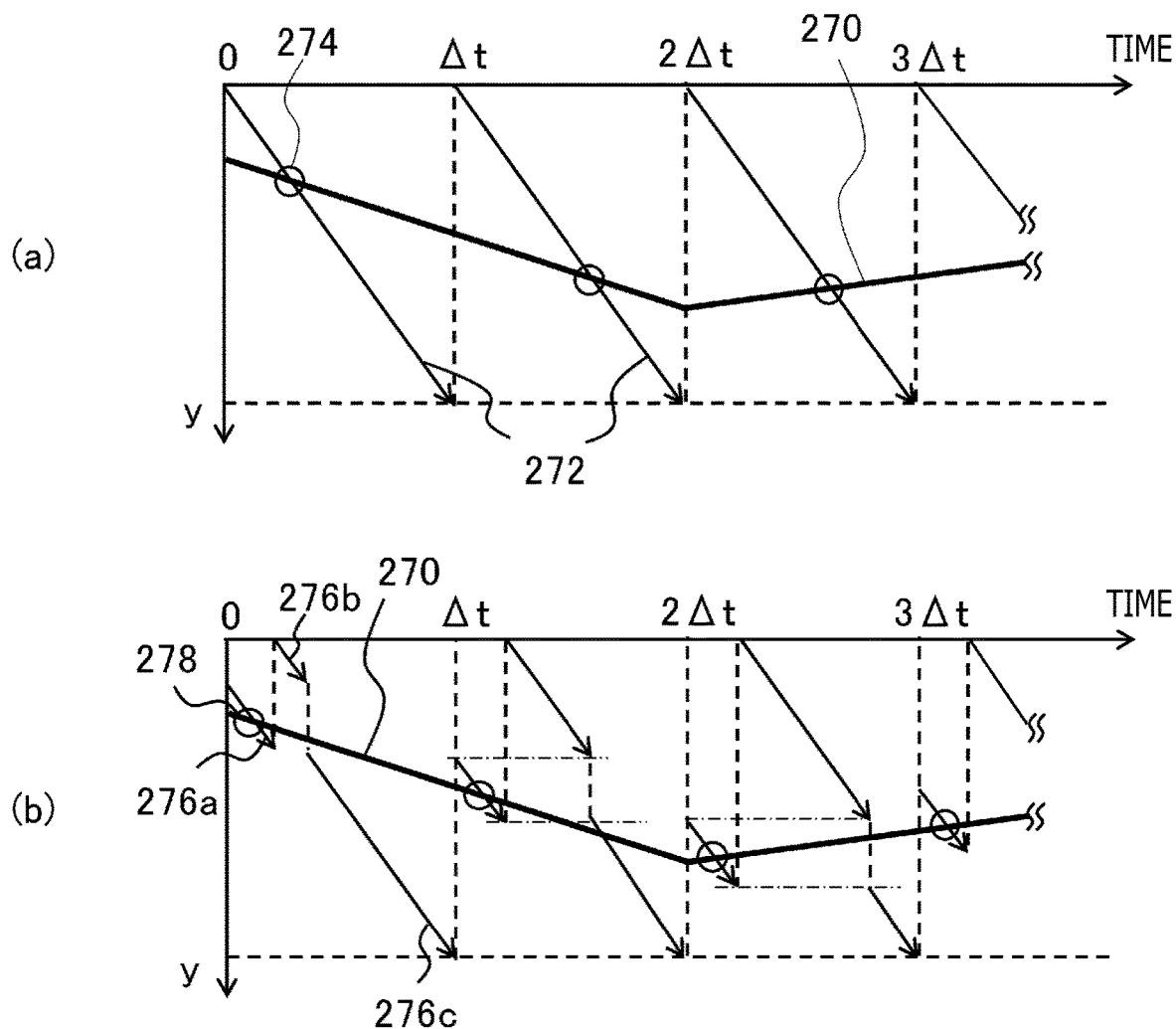
FIG. 10 depicts diagrams illustrating an effect that is produced by the embodiment when data in an area of interest is preferentially read out and outputted.

FIG. 10 depicts diagrams illustrating an effect that is produced by preferentially reading out and outputting the data in the area of interest. In FIG. 10, the vertical axis represents a vertical position coordinate (y-coordinate) in a case where the upper end of an image is 0, and the horizontal axis represents time. Arrows in FIG. 10 indicate a relation between data readout position and timing. Further, a thick line 270 in FIG. 10 indicates temporal changes in the y-coordinate of the gaze-corresponding point. In the case of a conventional technology depicted in (a) of FIG. 10, as indicated by the arrows 272, a pixel readout operation begins with the uppermost row line of an image, and the pixel readout operation of one frame is completed at time Δt. In this case, as indicated, for example, by circles 274, the timing for reading out the data in the area of interest centered on the gaze-corresponding point varies with the location of the gaze-corresponding point.

Meanwhile, in the case of the present embodiment depicted in (b) of FIG. 10, the data in the priority pixel columns centered on the gaze-corresponding point are first read out as indicated by the arrow 276a, and then the data in the pixel columns in the other areas are read out as indicated by the arrows 276b and 276c. For ease of understanding, FIG. 10 depicts an example in which the priority pixel columns and the other areas are respectively read out in sequence beginning with the upper row. In reality, however, the order of readout may be determined based on the gaze-corresponding point as mentioned earlier. In any case, according to the embodiment depicted in (b) of FIG. 10, the timing for reading out the data in the area of interest centered on the gaze-corresponding point is periodic without regard to the data readout position as indicated, for example, by a circle 278.

Stated differently, the data of an image initially outputted at predetermined vertical scanning intervals are clearly defined as the information regarding a high-priority area. Therefore, an increased amount of time can be spent for the data during the analysis and display image generation processes in the image processing device 10. Further, in a situation where it is difficult to display images at a predetermined frame rate due, for instance, to image complexity and intended analysis processing, control can be exercised to avoid a delayed image display by properly performing transmission and processing concerning the data in the area of interest and performing simplified processing on the other areas.

Figure 11:
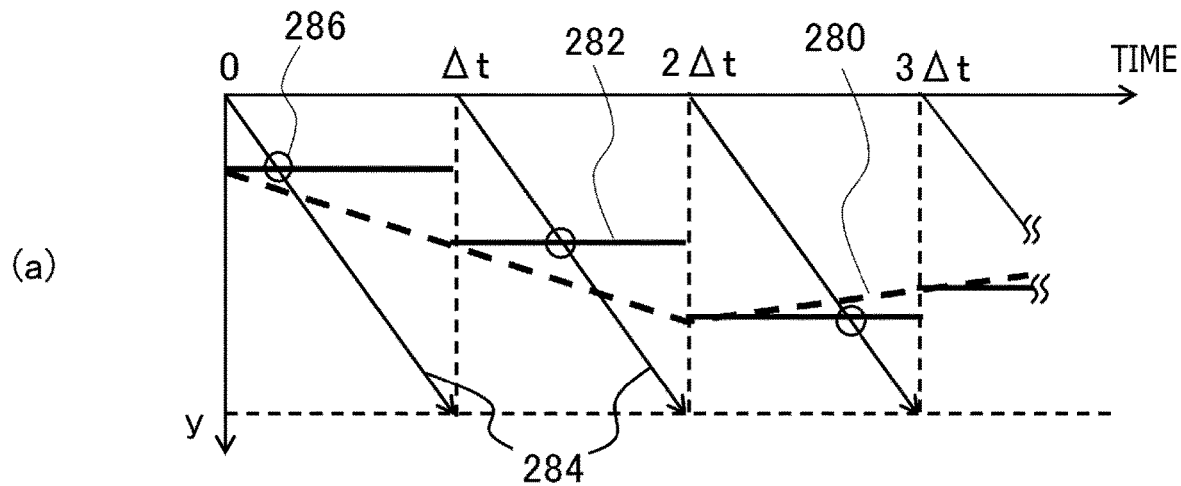
FIG. 11 depicts diagrams illustrating another effect that is produced by the embodiment when data in the area of interest is preferentially read out and outputted.

FIG. 11 depicts diagrams illustrating another effect that is produced by preferentially reading out and outputting the data in the area of interest. There is a conventionally proposed method for assuring the level of detail during processing on an important area similar to the area of interest in the present embodiment, processing and displaying the other areas at a lower level of detail, and thus reducing the size of data and increasing the speed of transmission. Depicted in (a) of FIG. 11 is a case where the above method is applied in a conventional order of readout. FIG. 11 uses substantially the same manner of representation as FIG. 10.

However, the information regarding the gaze point is to be given with a frequency equivalent to the frame rate. That is, an acquirable gaze-corresponding point is to vary as indicated by a thick line 282 while the actual gaze-corresponding point varies as indicated by a broken line 280. When, in this instance, the data in the pixels are read out in a downward direction beginning with the uppermost row of an image as indicated by arrows 284, the data in the pixels read out at time points marked, for example, by a circle 286 are handled as the data in the area of interest. However, the actual gaze-corresponding point moves with time. It is therefore possible that the actual gaze-corresponding point may not be included in the data read out as the data in the area of interest.

Meanwhile, in the present embodiment depicted in (b) of FIG. 11, the data in priority pixel columns corresponding to a given gaze point are first read out as indicated by an arrow 288. Therefore, the data of an image read out at a time point indicated by a circle 290 relates to the vicinity of the actual gaze-corresponding point. Consequently, when the resolution of data and the level of detail during processing are raised for the data of the image and lowered for the data of images subsequently read out, it is possible to display a high-quality image of the area of interest including the actual gaze-corresponding point, reduce the size of data, and decrease the length of time required for display. In this case, too, the effect provided by periodically outputting important data can be achieved similarly.

Figure 12:
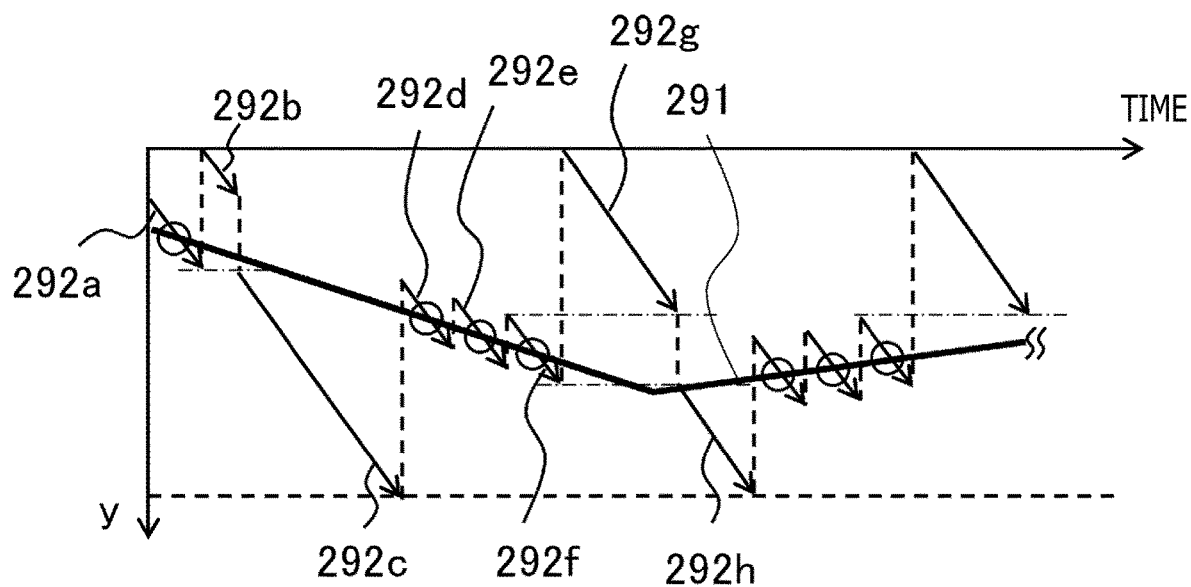
FIG. 12 is a diagram illustrating relation between data readout position and timing in an aspect of the embodiment where priority pixel columns and other areas differ in the frequency of readout.

In the examples depicted in FIGS. 10 and 11, only the order of reading out the data in the priority pixel columns and the data in the other areas is changed. Therefore, the time required for reading out one frame is similar to the case of a conventional technology. However, an alternative is to employ not only different orders of readout but also different frequencies of readout, use a newer image for the priority pixel columns for analysis and display purposes, and reduce the size of transmission data and the load on processing. FIG. 12 illustrates a relation between data readout position and timing in an aspect where the priority pixel columns and the other areas differ in the frequency of readout.

FIG. 12 uses substantially the same manner of representation as FIGS. 10 and 11. That is, a thick line 291 indicates temporal changes in the y-coordinate of the gaze-corresponding point. In the aspect depicted in FIG. 12, the information regarding the gaze point is to be acquired with the same frequency as the frequency with which at least only the priority pixel columns are read out. The example of FIG. 12 assumes that the data in the priority pixel columns are read out with a frequency three times higher than that for the data in the other areas. More specifically, the data in the priority pixel columns centered on the gaze-corresponding point are first read out as indicated by an arrow 292a, and then the data in the pixel columns in the other areas are read out as indicated by arrows 292b and 292c.

Next, as indicated by arrows 292d, 292e, and 292f, the data in the priority pixel columns centered on the gaze-corresponding point at each time point are repeatedly read out. Subsequently, as indicated by arrows 292g and 292h, the data in pixel columns in areas other than the immediately preceding priority pixel column are read out. This ensures that the latest information is reflected in analysis and display not only in a case where the gaze point is moving but also in a case where, for example, the shape and color of the gaze point change even if the gaze point is stationary.

In the aspect depicted in FIG. 12, it is conceivable that the electric charges in the pixels in the priority pixel columns are read out with high frequency to make an electric charge accumulation time shorter than in the other areas and thus lower the resulting brightness. Therefore, the space imaging section 110 may output the data in the priority pixel columns after multiplying such data by a gain value proportional to the frequency of readout. Further, the depicted example assumes that two different frequencies of readout are set by dividing the whole area into two areas, one for the priority pixel columns and the other for pixel columns in the other areas. However, an alternative is to divide the whole area into three or more areas, for example, by setting second priority pixel columns outside the priority pixel columns. In such a case, the frequencies of readout are respectively set for the three or more areas, and gain values proportional to the frequencies are respectively given to the three or more areas.

Further, if the frequency of readout is high and an analog signal indicative of an accumulated electric charge is small, it is conceivable that the SN (Signal-Noise) ratio lowers. Therefore, the space imaging section 110 may perform a noise removal process on the data in the priority pixel columns read out at a previous time point, and then output the resulting data. For example, the average value of data in the same pixels read out at a plurality of previous time points is acquired and compared with data read out at a current time point. If the difference from the average value is equal to or smaller than a predetermined threshold value, the average value is regarded as the data at the current time point. The noise removal process described above is known as 3DNR (Three-Dimensional Noise Reduction). In the present embodiment, however, the noise removal process is performed particularly on priority pixel columns read out with high frequency.

The process of multiplication by a gain value and the noise removal process may be performed simultaneously. Further, instead of acquiring the average value, the data in the same pixels at a plurality of previous time points may be added to the data read out at the current time point, and then the resulting sum may be outputted to simultaneously implement the gain process and the noise removal process. The number of sets of data to be added up in the above instance may be proportional to the frequency of data readout. However, pixels depicting an object moving relative to an imaging plane are excluded from an addition processing target to prevent an image from becoming smeared and losing its level of detail. Stated differently, based on the presence of object motion relative to the imaging plane 208, the space imaging section 110 determines whether or not to add up pixel data according to the frequency of readout. In this instance, the movement of an object can be detected by an existing motion detection process. The image processing device 10 may perform the motion detection process and feed the result of the motion detection process to the head-mounted display 100. An alternative is to let the space imaging section 110 perform the motion detection process.

Figure 13:
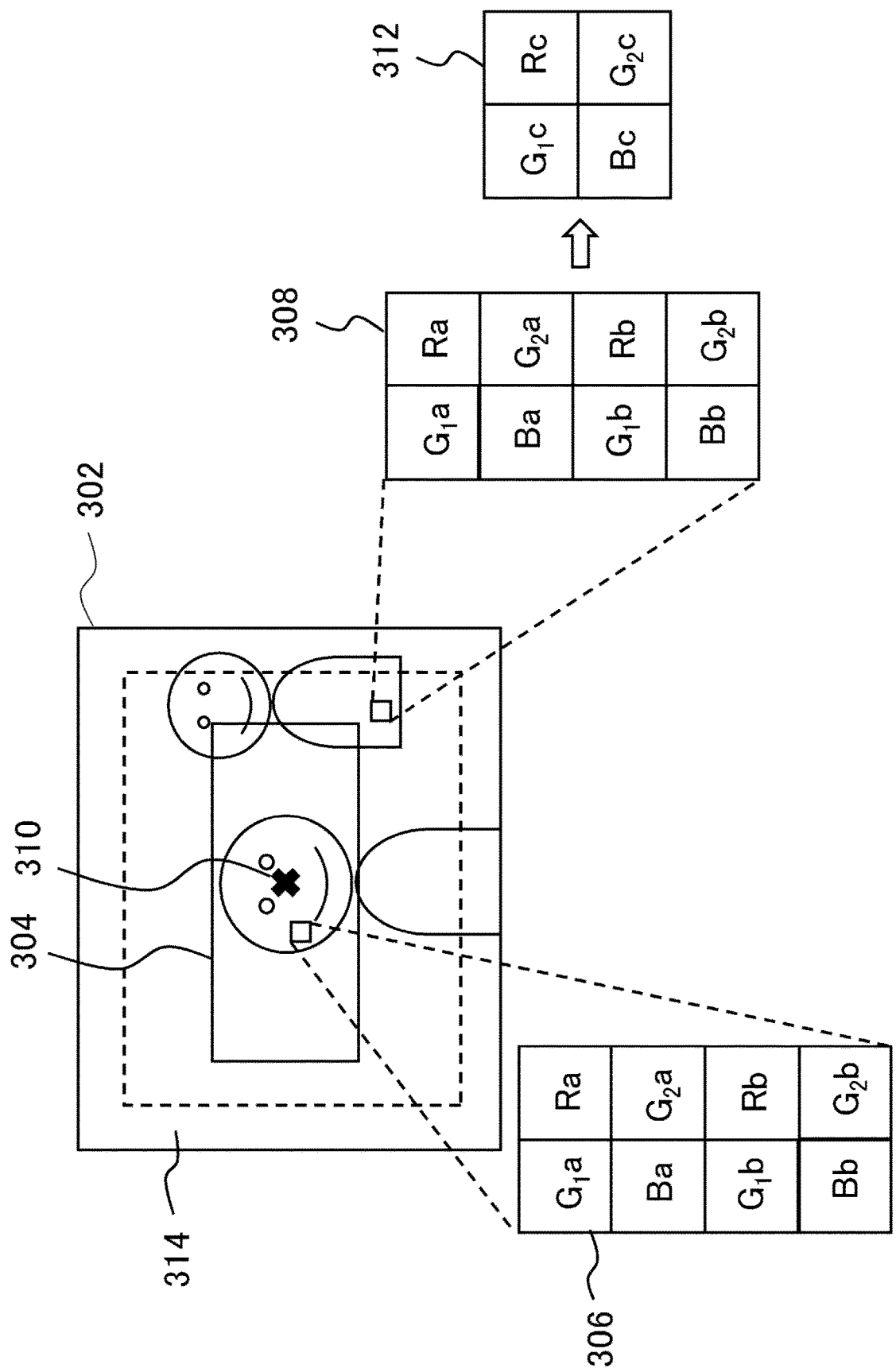
FIG. 13 is a diagram illustrating a method used in the embodiment to make a resolution of areas other than priority pixel columns lower than a resolution of the priority pixel columns.

Further, in the present embodiment, the priority pixel columns and the other areas may differ in resolution. FIG. 13 is a diagram illustrating a method of making the resolution of areas other than priority pixel columns lower than the resolution of the priority pixel columns. As described thus far, in a captured image plane 302, priority pixel columns 304 and the other areas are determined based on a gaze-corresponding point 310. In FIG. 13, some pixels in the priority pixel columns 304 and other areas are depicted enlarged as pixel blocks 306 and 308.

In a case where the imaging element includes color filters in Bayer arrangement, analog signals of two pixels of red color brightness Ra and Rb, four pixels of green color brightness G1a, G2a, G1b, and G2b, and two pixels of blue color brightness Ba and Bb are respectively read out from the pixel blocks 306 and 308 of 2×4 pixels. As regards the pixels in the priority pixel columns 304, the analog signals read out in the above manner are directly converted to digital signals, and then the resulting digital signals are variously processed and outputted.

Meanwhile, the space imaging section 110 lowers the resolution of areas other than the priority pixel columns 304 by adding up the signals of neighboring pixels having the same color, reading out the results of addition, and converting them to digital equivalents. Stated differently, based on the location of the area of interest in the imaging plane 208, the space imaging section 110 determines an area where the analog signals retained by a predetermined number of pixels within a predetermined distance are added up and converted to digital signals. For example, the analog signals of two same color pixels picked up by selecting every second pixel in the same column are added up. That is, the following computations are performed to determine the red color brightness Rc, the green color brightnesses G1c and G2c, and the blue color brightness Bc:

$$Rc = Ra + Rb$$

$$G1c = G1a + G1b$$

$$G2c = G2a + G2b$$

$$Bc = Ba + Bb$$

When the above computations are performed, pieces of information regarding two pixels arranged in column direction are added up to obtain one-pixel information. As a result, the information regarding the pixel block 308 of 2×4 pixels is compressed to information regarding a pixel block 312 of 2×2 pixels. However, three or more pixels may be added up. This addition process can be implemented, for example, by the ADCs depicted in FIG. 8.

More specifically, when the analog signal of one of two pixels targeted for addition matches the reference voltage, the analog signal of the other pixel is read out and repeatedly compared with the reference voltage without resetting the count reached by the counter 234. Subsequently, when the count reached upon the second match is regarded as a digital value derived from conversion, addition and analog-to-digital conversion can simultaneously be implemented. In a case where such an addition process is performed only on a part of the whole area, it is conceivable that an imaging sensor capable of exercising independent control on the basis of individual pixel blocks as depicted in FIG. 9 may be used.

Even in an aspect depicted in FIG. 13, for example, the second priority pixel columns may be set around the priority pixel columns to divide an image plane into three or more areas and thus vary the resolution in three or more steps. In any case, the size of data transmission can be made smaller than that when all the areas have the same resolution. Additionally, it is possible to reduce the load of analysis processing on unimportant areas, simplify a display, and further reduce the time required for display. Moreover, the aspect depicted in FIG. 13 may be combined with the aspect depicted in FIG. 12 so as to read out the priority pixel columns with high frequency and high resolution while reading out the other areas with low frequency and low resolution. This makes it possible to provide high-quality processing and display performance for the area of interest while further reducing the size of transmission and the load of processing.

A peripheral area 314 in the captured image plane 302 that is positioned at a certain distance from the gaze-corresponding point 310 is relatively unimportant in terms of user recognition and is highly likely to be unnecessary for image analysis and, in some cases, for display as well. Therefore, the space imaging section 110 may omit the data readout of pixels included in the peripheral area 314. For example, the space imaging section 110 may determine, as the peripheral area 314, an area positioned at a predetermined or longer distance from the gaze-corresponding point 310 or the area of interest according to the gaze-corresponding point 310, and inhibit the rows and pixel blocks including the relevant pixels from being driven.

In FIG. 13, the peripheral area 314 is assumed to be a frame-like area including four sides of the captured image plane 302. However, the peripheral area 314 is not limited to such a frame-like area and may alternatively be an area including, for example, the upper and lower end portions of the captured image plane 302. As another alternative, the whole area except the priority pixel columns 304 may be regarded as the peripheral area 314. These configurations make it possible to omit unnecessary data readout and transmission and achieve more rapid analysis and display.

Figure 14:
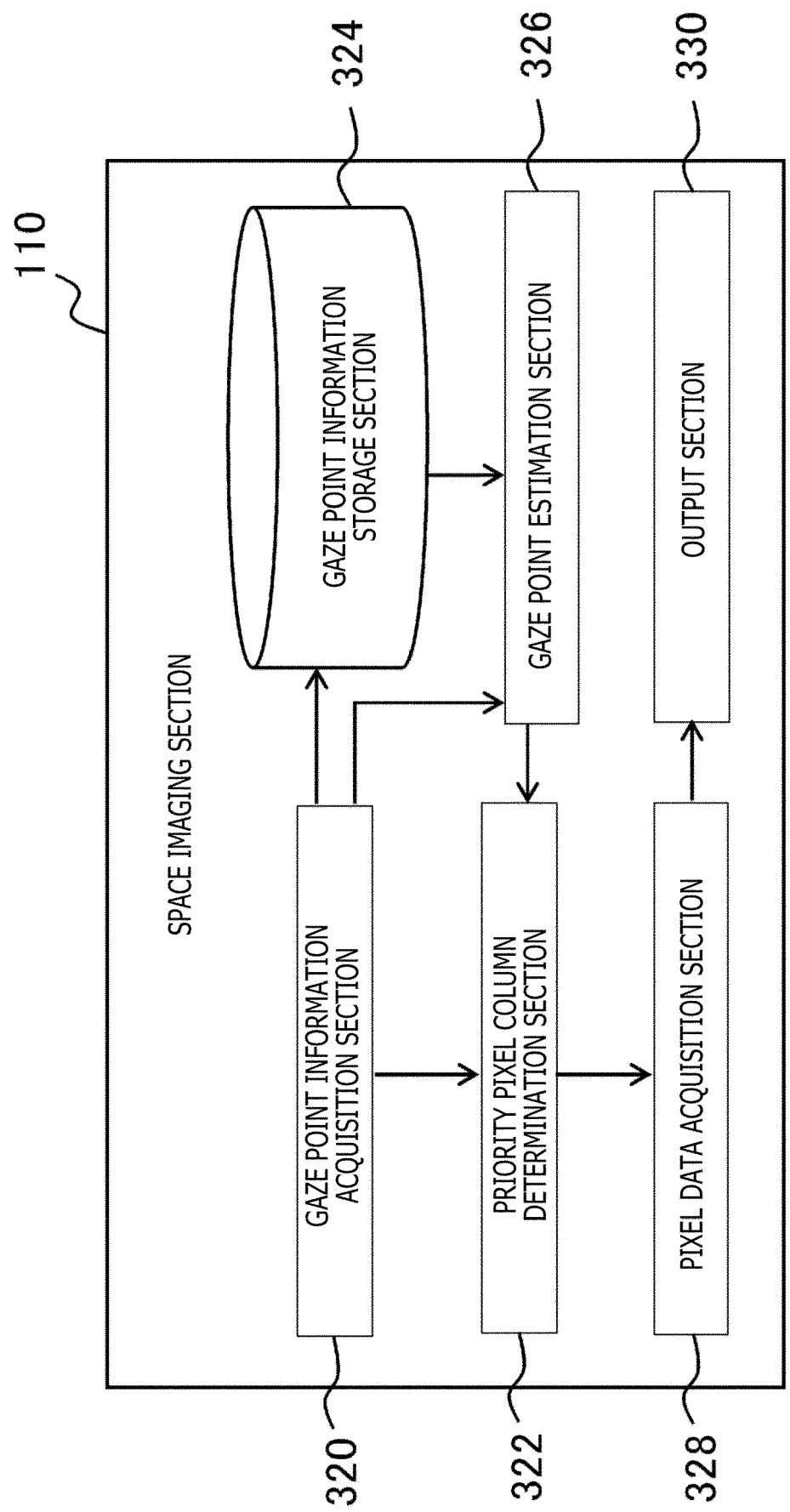
FIG. 14 is a diagram illustrating a functional block configuration of the space imaging section having an extended function for determining the priority pixel columns according to the embodiment.

In the examples described thus far, the gaze point detected at a certain time point by the gaze point detection section 120 is used to uniquely determine the gaze-corresponding point in a captured image and thus the priority pixel columns. Meanwhile, in order to improve the accuracy of processing, the priority pixel columns may be determined by considering various kinds of information. FIG. 14 illustrates a functional block configuration of the space imaging section 110 having an extended function for determining the priority pixel columns. The functional blocks depicted in FIG. 14 may be implemented as parts of the control circuit and signal processing circuit depicted in FIGS. 8 and 9, or at least some of their functions may be implemented by an additionally disposed microprocessor.

The space imaging section 110 includes a gaze point information acquisition section 320, a priority pixel column determination section 322, a pixel data acquisition section 328, and an output section 330. The gaze point information acquisition section 320 acquires information regarding a gaze point from the gaze point detection section 120. The priority pixel column determination section 322 identifies a gaze-corresponding point from the gaze point and determines the priority pixel columns according to the gaze-corresponding point. The pixel data acquisition section 328 reads out pixel data preferentially from the priority pixel columns and performs a predetermined process on the pixel data. The output section 330 outputs the data to the image processing device 10. The space imaging section 110 further includes a gaze point information storage section 324 and a gaze point estimation section 326. The gaze point information storage section 324 temporarily stores the information regarding the gaze point. The gaze point estimation section 326 estimates the gaze point and thus the gaze-corresponding point.

Basic operations of the gaze point information acquisition section 320 and the priority pixel column determination section 322 may be similar to those described in relation to the timing control circuit 226 in FIG. 8 and the control circuit 264 in FIG. 9. Further, the operations of the pixel data acquisition section 328 and the output section 330 may be similar to those, for example, of the pixel section 220, the ADCs 230, the signal processing circuit 244, and the output circuit 246 in FIG. 8 and those, for example, of the pixel section 250 and the readout control circuit 254 in FIG. 9.

Meanwhile, the gaze point information acquisition section 320 in the depicted example in FIG. 14 stores the information regarding the location of the gaze point, which is acquired from the gaze point detection section 120, in the gaze point information storage section 324. This storage operation is performed in preparation for a situation where the gaze point is indefinite when the gaze point detection section 120 fails to capture an image of the eyeballs due, for example, to blinking of the user's eyes. In this instance, valid information regarding the gaze point cannot be acquired from the gaze point detection section 120. Therefore, the gaze point information acquisition section 320 reports such an instance to the gaze point estimation section 326.

The gaze point estimation section 326 then reads out the latest acquired information regarding the gaze point from the gaze point information storage section 324 and supplies the information to the priority pixel column determination section 322 as the information regarding the current gaze point. In this case, at least the last acquired information regarding the gaze point needs to be stored in the gaze point information storage section 324. Alternatively, the gaze point estimation section 326 may read out earlier acquired gaze point information from the gaze point information storage section 324 in addition to the last acquired gaze point information, and estimate the current location of the gaze point according to temporal difference between the two read-out sets of gaze point information.

For example, previous temporal changes in the location of the gaze point may be extrapolated by a predetermined straight line or curved line in order to estimate subsequent changes in the location of the gaze point. In this case, the gaze point information regarding, for example, a predetermined number of frames should be stored in the gaze point information storage section 324. These configurations make it possible to continuously determine the priority pixel columns even when the gaze point becomes indefinite due, for example, to blinking of the user's eyes. This aspect becomes effective even in a case other than the case where the gaze point is indefinite.

For example, in a case where the data in the priority pixel columns are to be read out with increased frequency as depicted in FIG. 12, the gaze point needs to be acquired with the corresponding frequency. In this case, even when the information is supplied with low frequency from the gaze point detection section 120, the gaze point estimation section 326 is able to estimate, based on previous changes in the location of the gaze point, the gaze point at a time point at which priority pixel column readout begins. This process corresponds to a process of estimating the thick line 291 in FIG. 12.

The gaze point may be estimated based on information irrelevant to the previous changes in the location of the gaze point. For example, in a case where a new object enters an imaging target space to be imaged by the space imaging section 110 or a sound is heard from a certain location in the imaging target space, humans are highly likely to turn their eyes toward the new object or the sound. Based on such phenomena, the gaze point estimation section 326 detects the entry of an object according to a captured image or uses an undepicted microphone to identify the direction from which a sound is coming. The gaze point estimation section 326 then notifies the priority pixel column determination section 322 of the next gaze point, that is, an area of an image that corresponds to the identified direction. This process may be performed only upon the occurrence of such phenomena or performed continuously during a predetermined period depending on the state of an object or a sound.

Figure 15:
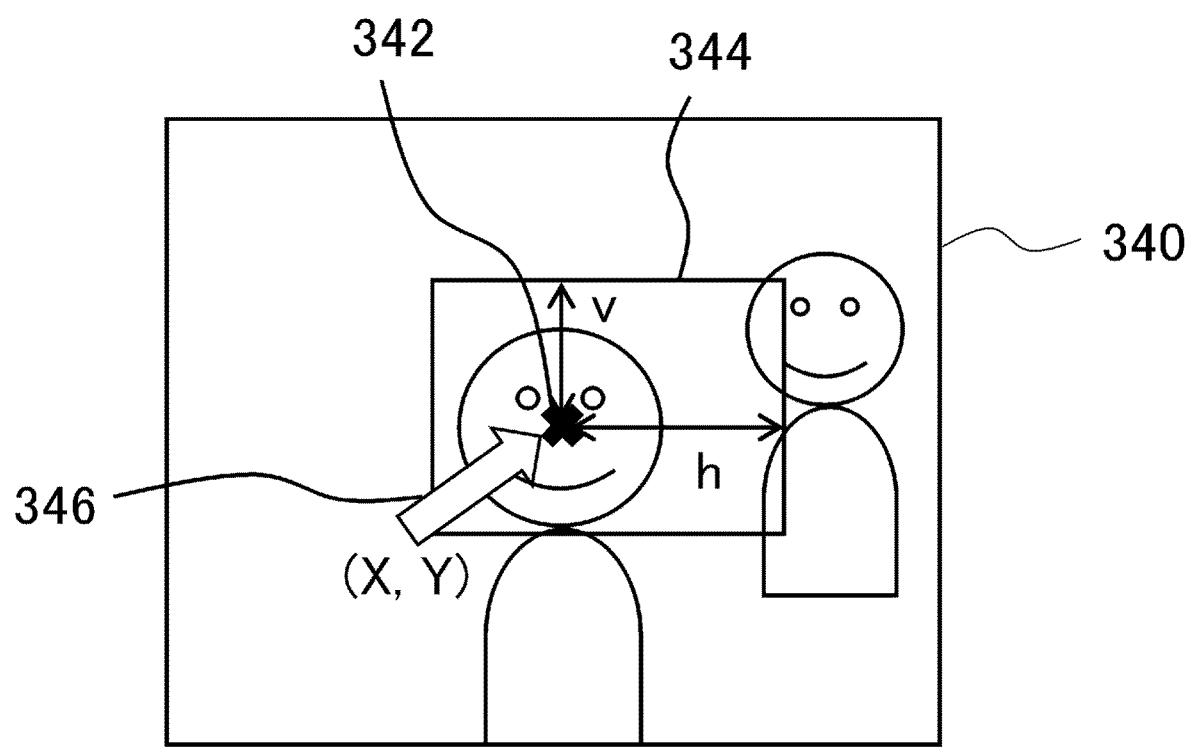
FIG. 15 is a diagram illustrating a method used in the embodiment to adjust a range of the area of interest according to the movement of the gaze point.

The range of the area of interest may be adjusted according to such movement of a gaze point and thus the movement of a gaze-corresponding point. FIG. 15 is a diagram illustrating a method of adjusting the range of the area of interest according to the movement of the gaze point. In a captured image plane 340, a gaze-corresponding point 342 is at a location similar to that of the gaze-corresponding point 204 depicted in FIG. 6. In the example of FIG. 6, an area centered on the gaze-corresponding point 204 is determined as the area of interest 206. In the case of FIG. 15, an area of interest 344 is determined in consideration of a path along which the gaze-corresponding point has moved.

For example, if the gaze-corresponding point has moved toward the gaze-corresponding point 342 during a unit time as indicated by a gaze-corresponding point movement vector 346, it is highly probable that similar movement continues. Therefore, the area of interest is expanded in the corresponding direction. More specifically, distances (h, v) between the gaze-corresponding point 342 and two out of four sides of the area of interest 344 that oppose the gaze-corresponding point movement vector 346 are extended by the same ratio as the ratio between elements (X, Y) of the gaze-corresponding point movement vector 346. Alternatively, the area of interest 344 may be parallel-shifted in horizontal and vertical directions by the same ratio as the ratio between the elements (X, Y) of the gaze-corresponding point movement vector 346 without changing the size of the area of interest.

The area of interest may be adjusted based on an actual movement history (movement path) of the gaze point as described above or determined based on an object movement or a sound in the imaging target space as described earlier. Further, the determination may be made based, for example, on the movement of an object in a display image or based on the location of a sound outputted from the speakers of the head-mounted display 100. These pieces of information may be combined as appropriate. In this manner, the gaze-corresponding point corresponding to an actual gaze point can accurately be included in the area of interest even if the gaze point is indefinite, in significant error, or greatly moving.

When an image display technology based on the use of a captured image is adopted, the present embodiment, which has been described above, controls, based on a user's gaze point with respect to a displayed image, the order in which data in a captured image plane is to be read out. Therefore, an important area of the captured image, which is particularly important for image analysis and display, can be transmitted to an image processing device and a display device at the beginning of a frame. Further, various processes in such devices can be performed prior to those on the other areas. Furthermore, the data in the important area are read out at constant intervals. This makes it possible to easily estimate the time available for subsequent processes.

Moreover, the data in areas near the important area can immediately be outputted according to a time point at which the gaze point is detected. Therefore, in the case of performing an image analysis locally on an area of interest or raising the resolution, it is possible to reduce the positional displacement from an actual area of interest. Additionally, when pixel columns including the area of interest are read out with higher frequency than the other areas or the resolution of the other areas is lowered at the time of data readout, it is possible to not only transmit the data in the important area properly and at high quality but also reduce the size of transmission data.

Further, the present embodiment estimates the gaze point and adjusts the range of the area of interest in accordance, for example, with the history of movement of the gaze point, changes in an object or sound in an imaging target space, or changes in a display image or an outputted voice. This makes it possible to accurately read out the data in the area of interest irrespective of the accuracy of gaze point detection. As described above, when a captured image is used for image display purposes, the present embodiment reduces the time interval between image capture and image display and provides high-quality display performance with low delay without sacrificing visual image quality and processing accuracy.

While the present invention has been described in conjunction with an embodiment, it will be understood by those skilled in the art that the embodiment is illustrative and not restrictive; and that the combination of constituent elements and individual processes in the embodiment may be variously modified; and further that such modifications also fall within the scope of the present invention.

For example, the present embodiment has been described with reference to a space imaging sensor that captures an image for use as a display image. However, the same mechanism as described in conjunction with the present embodiment may be applied to an eyeball imaging sensor of a gaze point detection section. In such a case, information regarding the locations of pupils at a previous time point, which is acquired by capturing an image of eyeballs, is fed back to a local device. Subsequently, the data in a predetermined range of area centered on the locations of pupils, which is included in the eyeball image captured at the next time point, is read out prior to the data in the other areas.

In the above case, too, the data of an image of the pupils can be read out and outputted properly and periodically. The read-out data is immediately inputted to the application processor 212 in (a) of FIG. 7 and to the logic circuit of the gaze point detection sensor 216 in (b) of FIG. 7. Therefore, the position coordinates of a gaze point can periodically be derived irrespective of the location of the image of the pupils in a captured image. Advantages similar to those of the present embodiment can be obtained by applying all or some of the aspects depicted in FIGS. 10 to 15 to the eyeball imaging sensor. Further, processes of image capture to image display may be implemented at higher speed and higher accuracy by applying all or some of the aspects to both the eyeball imaging sensor and the space imaging sensor.

Further, the present embodiment has been described in relation to an imaging sensor that captures a common image representative of visible light. However, the present embodiment is not limited to that type of sensor. More specifically, the type of physical quantity expressed by pixel values is not particularly limited as far as information indicated by the physical quantity is acquired as two-dimensional pixel values. An alternative is to use, for example, an infrared sensor or PSD sensor used for the above-mentioned gaze point detection, a depth sensor for acquiring distance information regarding an object, or a multispectral sensor for acquiring information regarding a plurality of wavelength bands.

Moreover, the present embodiment has been described on the assumption that the factor of priority pixel column determination is regarded as the gaze point for a display image. However, the factor of priority pixel column determination may vary with the detection target of the sensor and the purpose of its use. For example, the factor of priority pixel column determination may be a location where a target object image is present or characteristic pixel values are observed. In any case, advantages similar to those of the present embodiment can be obtained by preferentially reading out and outputting the data in an area considered important.

REFERENCE SIGNS LIST

10 Image processing device, 23 CPU, 24 GPU, 26 Main memory, 50 Captured-image data acquisition section, 52 Image analysis section, 54 Display image generation section, 56 Output section, 100 Head-mounted display, 110 Space imaging section, 120 Gaze point detection section, 122 Display image data acquisition section, 124 Display section, 210 Eyeball imaging sensor, 212 Application processor, 214 Space imaging sensor, 216 Gaze point detection sensor, 214 Space imaging sensor, 320 Gaze point information acquisition section, 322 Priority pixel column determination section, 324 Gaze point information storage section, 326 Gaze point estimation section, 328 Pixel data acquisition section, 330 Output section.

INDUSTRIAL APPLICABILITY

As described above, the present invention is applicable to various devices, such as an imaging device, a head-mounted display, a sensor, an image processing device, and a content reproduction device, and to a system including these devices.

The invention claimed is:

1. A head-mounted display comprising:
an imaging sensor;
a display panel that displays an image generated based on an image captured by the imaging sensor; and
a gaze point detector that detects a user's gaze point with respect to the displayed image, wherein
the imaging sensor includes
a control circuit that determines an area of interest according to a gaze-corresponding point in an imaging plane and exercises control in such a manner that pieces of data retained by individual pixels are read out in an order dependent on a location of the area of interest according to the gaze-corresponding point in the imaging plane, the gaze-corresponding point being a point corresponding to the user's gaze point,
a readout processing circuit that reads out pixel data in the controlled order and performs a predetermined process on the pixel data, and
an output circuit that sequentially outputs the pixel data subjected to the predetermined process.

2. The head-mounted display according to claim 1, wherein
the readout processing circuit includes an analog-to-digital converter circuit that converts an analog signal retained by each pixel to a digital signal in the controlled order.

3. The head-mounted display according to claim 2, wherein
the readout processing circuit determines, based on the location of the area of interest in the imaging plane, an area where analog signals retained by a predetermined number of pixels located at a predetermined distance are added up and converted to digital signals.

4. The head-mounted display according to claim 1, wherein
the readout processing circuit includes a signal processing section that exercises control to determine whether or not each of pixel blocks is targeted for data readout, the pixel blocks being obtained by dividing the imaging plane in both horizontal and vertical directions, and
the control circuit determines, based on a positional relation with the area of interest in the imaging plane, an order of reading out pixel columns in each of the pixel blocks.

5. The head-mounted display according to claim 1, wherein
the control circuit exercises control in such a manner that a frequency of pixel data readout varies with each area determined based on the location of the area of interest in the imaging plane.

6. The head-mounted display according to claim 5, wherein
the readout processing circuit multiplies read-out pixel data by a gain value based on the frequency.

7. The head-mounted display according to claim 5, wherein
the readout processing circuit adds up data in the same pixels as those read out at a previous time point, the number of sets of data to be added up being based on the frequency.

8. The head-mounted display according to claim 7, wherein
the readout processing circuit determines, based on presence of object motion relative to the imaging plane, whether or not to add up pixel data according to the frequency.

9. The head-mounted display according to claim 1, wherein
the control circuit determines, based on the location of the area of interest in the imaging plane, the area to be excluded from a data readout target.

10. The head-mounted display according to claim 1, further comprising:
a gaze point information storage section that stores information regarding position coordinates of the user's gaze point at a previous time point; and
a gaze point estimation section that estimates subsequent position coordinates of the user's gaze point by using the position coordinates of the user's gaze point at the previous time point, wherein
the control circuit determines the area of interest by using the estimated gaze point.

11. The head-mounted display according to claim 1, further comprising:
a gaze point information storage section that stores information regarding position coordinates of the user's gaze point at a previous time point, wherein
the control circuit adjusts a range of the area of interest according to a movement path of the user's gaze point.

12. The head-mounted display according to claim 1, further comprising:
a gaze point estimation section that estimates subsequent position coordinates of the user's gaze point according to an object movement or a sound in an imaging target space, wherein
the control circuit determines the area of interest by using the estimated gaze point.

13. The head-mounted display according to claim 1, wherein the control circuit adjusts a range of the area of interest according to a movement of an object in an image displayed on the display device or a location of an outputted sound.

14. The head-mounted display according to claim 1, wherein the gaze point detector includes
a gaze point detection imaging sensor that captures an image of eyeballs of a user viewing a display screen, and
an image analysis section that acquires position coordinates of a gaze point on the display screen according to the captured image, and
the gaze point detection imaging sensor includes
a control circuit that determines an area of interest according to locations of pupils in an image captured at a previous time point and exercises control in such a manner that pieces of data retained by individual pixels are read out in an order dependent on the location of the area of interest according to a gaze-corresponding point in an imaging plane, the gaze-corresponding point being a point corresponding to the user's gaze point,
a readout processing circuit that reads out the pixel data in the controlled order and performs a predetermined process on the pixel data, and
an output circuit that sequentially outputs the pixel data subjected to the predetermined process.

15. A gaze point detector comprising:
an imaging sensor that captures an image of eyeballs of a user viewing a display screen; and
an image analysis section that acquires position coordinates of a gaze point on the display screen according to the captured image, wherein
the imaging sensor includes
a control circuit that determines an area of interest according to an image captured at a previous time point and exercises control in such a manner that pieces of data retained by individual pixels are read out in an order dependent on a location of the area of interest according to a gaze-corresponding point in an imaging plane, the gaze-corresponding point being a point corresponding to the user's gaze point,
a readout processing circuit that reads out pixel data in the controlled order and performs a predetermined process on the pixel data, and
an output circuit that sequentially outputs the pixel data subjected to the predetermined process.

16. A pixel data readout method for a head-mounted display including an imaging sensor, a display panel, and a gaze point detector, the display panel displaying an image generated based on an image captured by the imaging sensor, the gaze point detector detecting a user's gaze point with respect to the displayed image, the pixel data readout method comprising:
determining an area of interest according to a gaze-corresponding point in an imaging plane and exercising control in such a manner that pieces of data retained by the individual pixels are read out in an order dependent on a location of the area of interest according to the gaze-corresponding point in the imaging plane, the gaze-corresponding point being a point corresponding to the user's gaze point;
reading out pixel data in the controlled order and performing a predetermined process on the pixel data; and
sequentially outputting the pixel data subjected to the predetermined process.

* * * * *